(12) United States Patent
Lu et al.

(10) Patent No.: US 12,000,990 B2
(45) Date of Patent: Jun. 4, 2024

(54) OPTICAL IMAGING LENS ASSEMBLY

(71) Applicant: ZHEJIANG SUNNY OPTICS CO., LTD., Zhejiang (CN)

(72) Inventors: Jia Lu, Zhejiang (CN); Binqing Wang, Zhejiang (CN); Meng Yang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 519 days.

(21) Appl. No.: 17/361,438

(22) Filed: Jun. 29, 2021

(65) Prior Publication Data
US 2022/0057606 A1   Feb. 24, 2022

(30) Foreign Application Priority Data
Aug. 18, 2020   (CN) .......................... 202010831223.8

(51) Int. Cl.
*G02B 9/64* (2006.01)
*G02B 13/00* (2006.01)
*G02B 27/00* (2006.01)

(52) U.S. Cl.
CPC .......... *G02B 13/0045* (2013.01); *G02B 9/64* (2013.01); *G02B 27/0025* (2013.01)

(58) Field of Classification Search
CPC ...... G02B 13/0045; G02B 13/18; G02B 9/64; G02B 27/0025
USPC .......................................... 359/708
See application file for complete search history.

(56) References Cited

U.S. PATENT DOCUMENTS

| | | | | |
|---|---|---|---|---|
| 3,877,795 A * | 4/1975 | Yamashita | ............. | G02B 13/04 359/749 |
| 3,924,935 A * | 12/1975 | Takahashi | ............. | G02B 13/04 359/723 |
| 4,013,350 A * | 3/1977 | Ogawa | ................... | G02B 13/06 359/749 |
| 4,241,981 A * | 12/1980 | Okudaira | ........... | G02B 15/1425 359/708 |
| 8,179,610 B2 * | 5/2012 | Takano | .................. | G02B 13/18 348/340 |
| 10,139,595 B1 * | 11/2018 | Hudyma | ............... | G02B 13/006 |
| 2008/0068726 A1 * | 3/2008 | Horneber | ............... | G02B 13/04 359/680 |
| 2011/0002048 A1 * | 1/2011 | Takano | ................... | G02B 13/18 359/687 |
| 2017/0212334 A1 * | 7/2017 | Imaoka | ................... | G02B 13/08 |
| 2020/0158995 A1 * | 5/2020 | Hudyma | ............... | G02B 13/04 |
| 2021/0096324 A1 * | 4/2021 | Kamo | .................. | G02B 23/243 |

(Continued)

*Primary Examiner* — William R Alexander
(74) *Attorney, Agent, or Firm* — Samson G. Yu

(57) ABSTRACT

The disclosure provides an optical imaging lens assembly, which sequentially includes from an object side to an image side along an optical axis: a first lens with a positive refractive power; a second lens with a refractive power; a third lens with a refractive power; a fourth lens with a refractive power; a fifth lens with a positive refractive power; a sixth lens with a negative refractive power; a seventh lens with a refractive power; an eighth lens with a positive refractive power; a ninth lens with a refractive power; and a tenth lens with a negative refractive power; wherein an effective focal length f of the optical imaging lens assembly and a maximum field of view FOV of the optical imaging lens assembly satisfy f×tan(½FOV)>6.0 mm.

20 Claims, 15 Drawing Sheets

(56) References Cited

U.S. PATENT DOCUMENTS

2021/0181466 A1\* 6/2021 Lee .................. G02B 13/04
2022/0066176 A1\* 3/2022 Roth ................. G02B 13/06

\* cited by examiner longitudinal aberration curve (millimeter)

OPTICAL IMAGING LENS ASSEMBLY

CROSS-REFERENCE TO RELATED PRESENT INVENTION(S)

The disclosure claims priority to and the benefit of Chinese Patent Present invention No. 202010831223.8, filed in the China National Intellectual Property Administration (CNIPA) on 18 Aug. 2020, which is incorporated herein by reference in its entirety.

TECHNICAL FIELD

The disclosure relates to the technical field of optical elements, and particularly to an optical imaging lens assembly.

BACKGROUND

From 8 mega-pixels in 2010 to 100 mega-pixels in 2020 and from single-lens cameras a few years ago to present combined multi-lens cameras, new developments may be made regularly to photographing with mobile phones, and new ultrahigh-pixel smart phones have rapidly become popular on the market one after another, not only occupied "central position" in flagship phones that have been launched recently, and even extended the influence to the field of mobile phones worth 1,000 to 2,000 yuan. Resolution is directly proportional to the number of lenses of an imaging lens group. If the number of the lenses is larger, the imaging quality of the lenses is higher, and the resolving power and the contrast may be improved greatly.

As one of key members of combined multi-lens camera, main camera lens with a high resolution is responsible for shooting global pictures, and becomes an important object that each major mobile phone company keeps researching and improving. With the constant development of portable electronic products such as smart phones, requirements of users on the performance of camera lens groups of mobile phones have also increased. A camera lens group with multi-lens that provides a higher degree of design freedom makes it more possible to improve the performance of a mobile phone.

SUMMARY

Based on this, it is necessary to provide an optical imaging lens assembly, i.e., a camera lens group with ten lenses has a large image surface, and an ultrathin design of a mobile phone is ensured.

Some embodiments of the disclosure provide an optical imaging lens assembly, which sequentially includes from an object side to an image side along an optical axis: a first lens with a positive refractive power; a second lens with a refractive power; a third lens with a refractive power; a fourth lens with a refractive power; a fifth lens with a positive refractive power; a sixth lens with a negative refractive power; a seventh lens with a refractive power; an eighth lens with a positive refractive power; a ninth lens with a refractive power; and a tenth lens with a negative refractive power; wherein an effective focal length f of the optical imaging lens assembly and a maximum field of view FOV of the optical imaging lens assembly satisfy f×tan(½FOV) >6.0 mm.

In an implementation mode, an effective focal length f1 of the first lens, an effective focal length f3 of the third lens, and an effective focal length f4 of the fourth lens satisfy $0.8 < f1/(f3+f4) < 1.3$.

In an implementation mode, an effective focal length f6 of the sixth lens, an effective focal length f10 of the tenth lens, and an effective focal length f9 of the ninth lens satisfy $1.0 < (f6+f10)/f9 < 1.5$.

In an implementation mode, a curvature radius R16 of an image-side surface of the eighth lens, a curvature radius R15 of an object-side surface of the eighth lens, and an effective focal length f8 of the eighth lens satisfy $1.0 < (R16-R15)/f8 < 2.0$.

In an implementation mode, ImgH is a half of a diagonal length of an effective pixel region on an imaging surface of the optical imaging lens assembly, and an on-axis distance TTL from an object-side surface of the first lens to the imaging surface and ImgH satisfy $TTL/ImgH < 1.4$.

In an implementation mode, the effective focal length f of the optical imaging lens assembly satisfies $7.0 \text{ mm} < f < 10.0 \text{ mm}$.

In an implementation mode, a curvature radius R5 of an object-side surface of the third lens and a curvature radius R6 of an image-side surface of the third lens satisfy $2.0 < (R5+R6)/(R5-R6) < 3.0$.

In an implementation mode, a curvature radius R12 of an image-side surface of the sixth lens and a curvature radius R11 of an object-side surface of the sixth lens satisfy $1.5 < R12/R11 < 2.5$.

In an implementation mode, a curvature radius R19 of an object-side surface of the tenth lens and a curvature radius R20 of an image-side surface of the tenth lens satisfy $1.0 < (R19+R20)/(R19-R20) < 1.5$.

In an implementation mode, a center thickness CT6 of the sixth lens on the optical axis, a center thickness CT7 of the seventh lens on the optical axis, and a center thickness CT8 of the eighth lens on the optical axis satisfy $1.2 < (CT6+CT7)/CT8 < 1.6$.

In an implementation mode, a combined focal length f67 of the sixth lens and the seventh lens, a combined focal length f12 of the first lens and the second lens, and a combined focal length f89 of the eighth lens and the ninth lens satisfy $1.5 < f67/(f12+f89) < 3.0$.

In an implementation mode, an edge thickness ET5 of the fifth lens and a center thickness CT5 of the fifth lens on the optical axis satisfy $1.9 < CT5/ET5 < 3.0$.

In an implementation mode, an on-axis distance SAG82 from an intersection point of the image-side surface of the eighth lens and the optical axis to an effective radius vertex of the image-side surface of the eighth lens and an on-axis distance SAG81 from an intersection point of the object-side surface of the eighth lens and the optical axis to an effective radius vertex of the object-side surface of the eighth lens satisfy $0.9 < SAG82/SAG81 < 1.5$.

In an implementation mode, the lenses are independent of one another, and form air spaces on the optical axis; and at least four lenses in the first lens to the tenth lens are made of a plastic material.

In an implementation mode, the object-side surface of the sixth lens is a concave surface, and the image-side surface is a convex surface; and the object-side surface of the eighth lens is a concave surface, and the image-side surface is a convex surface.

Some other embodiments of the disclosure also provide an optical imaging lens assembly, which sequentially includes from an object side to an image side along an optical axis: a first lens with a positive refractive power; a second lens with a refractive power; a third lens with a refractive power; a fourth lens with a refractive power; a fifth lens with a positive refractive power; a sixth lens with a negative refractive power; a seventh lens with a refractive power; an eighth lens with a positive refractive power; a ninth lens with a refractive power; and a tenth lens with a negative refractive power; wherein the lenses are independent of one another, and form air spaces on the optical axis; and ImgH is a half of a diagonal length of an effective pixel region on an imaging surface of the optical imaging lens assembly, and an on-axis distance TTL from an object-side surface of the first lens to the imaging surface and ImgH satisfy TTL/ImgH<1.4.

In an implementation mode, an effective focal length f of the optical imaging lens assembly and a maximum field of view FOV of the optical imaging lens assembly satisfy f×tan(½FOV)>6.0 mm.

In an implementation mode, an effective focal length f1 of the first lens, an effective focal length f3 of the third lens, and an effective focal length f4 of the fourth lens satisfy 0.8<f1/(f3+f4)<1.3; and an effective focal length f6 of the sixth lens, an effective focal length f10 of the tenth lens, and an effective focal length f9 of the ninth lens satisfy 1.0<(f6+f10)/f9<1.5.

In an implementation mode, a curvature radius R16 of an image-side surface of the eighth lens, a curvature radius R15 of an object-side surface of the eighth lens, and an effective focal length f8 of the eighth lens satisfy 1.0<(R16−R15)/f8<2.0.

In an implementation mode, a curvature radius R5 of an object-side surface of the third lens and a curvature radius R6 of an image-side surface of the third lens satisfy 2.0<(R5+R6)/(R5−R6)<3.0.

In an implementation mode, a curvature radius R12 of an image-side surface of the sixth lens and a curvature radius R11 of an object-side surface of the sixth lens satisfy 1.5<R12/R11<2.5.

In an implementation mode, a curvature radius R19 of an object-side surface of the tenth lens and a curvature radius R20 of an image-side surface of the tenth lens satisfy 1.0<(R19+R20)/(R19−R20)<1.5.

In an implementation mode, a center thickness CT6 of the sixth lens on the optical axis, a center thickness CT7 of the seventh lens on the optical axis, and a center thickness CT8 of the eighth lens on the optical axis satisfy 1.2<(CT6+CT7)/CT8<1.6.

In an implementation mode, a combined focal length f67 of the sixth lens and the seventh lens, a combined focal length f12 of the first lens and the second lens, and a combined focal length f89 of the eighth lens and the ninth lens satisfy 1.5<f67/(f12+f89)<3.0.

In an implementation mode, an edge thickness ET5 of the fifth lens and a center thickness CT5 of the fifth lens on the optical axis satisfy 1.9<CT5/ET5<3.0.

In an implementation mode, an on-axis distance SAG82 from an intersection point of the image-side surface of the eighth lens and the optical axis to an effective radius vertex of the image-side surface of the eighth lens and an on-axis distance SAG81 from an intersection point of the object-side surface of the eighth lens and the optical axis to an effective radius vertex of the object-side surface of the eighth lens satisfy 0.9<SAG82/SAG81<1.5.

In an implementation mode, the lenses are independent of one another, and form air spaces on the optical axis; and at least four lenses in the first lens to the tenth lens are made of a plastic material.

In an implementation mode, the object-side surface of the sixth lens is a concave surface, and the image-side surface is a convex surface; and the object-side surface of the eighth lens is a concave surface, and the image-side surface is a convex surface.

In an implementation mode, the effective focal length f of the optical imaging lens assembly satisfies 7.0 mm<f<10.0 mm.

A camera lens group with ten lenses provided by the disclosure has a large image surface, and ensures an ultrathin design of a mobile phone, is more adapted to demands of field of view and the market trend of development of mobile phones to ultrathin designs, and may satisfy requirements of users on high pixels and high resolutions during daily photographing with mobile phones.

BRIEF DESCRIPTION OF THE DRAWINGS

In order to describe the technical solutions in embodiments of the disclosure or a related art more clearly, the drawings required to be used for descriptions about the embodiments or the related art will be simply introduced below. It is apparent that the drawings described below are only some embodiments of the disclosure. Those of ordinary skill in the art may further obtain other drawings according to the structures shown in these drawings without creative work.

Figure 1:
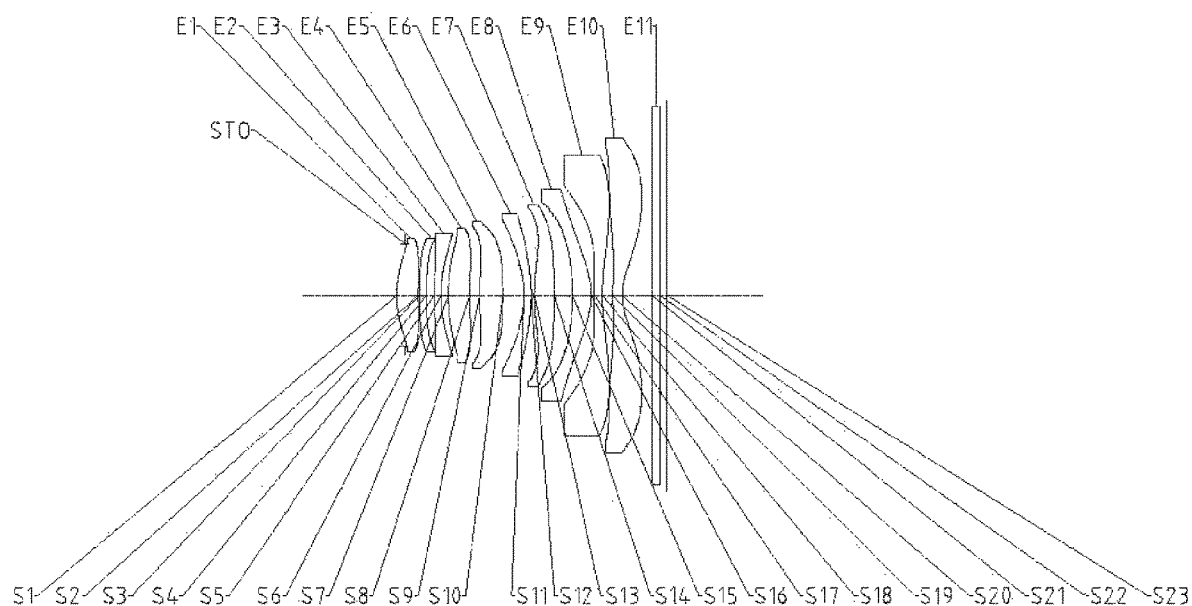
FIG. 1 shows a structural schematic diagram of an optical imaging lens assembly according to Embodiment 1 of the disclosure.

Implementation of the purpose, functional characteristics and advantages of the disclosure will further be described in combination with the embodiments and reference to the drawings.

DETAILED DESCRIPTION OF THE EMBODIMENTS

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It should also be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to the exemplary embodiment of the disclosure may include, for example, ten lenses with refractive power, i.e., a first lens, a second lens, a third lens, a fourth lens, a fifth lens, a sixth lens, a seventh lens, an eighth lens, a ninth lens, and a tenth lens. The ten lenses are sequentially arranged from an object side to an image side along an optical axis.

In an exemplary embodiment, the first lens has a positive refractive power; the second lens may have a positive refractive power or a negative refractive power; the third lens may have a positive refractive power or a negative refractive power; the fourth lens may have a positive refractive power or a negative refractive power; the fifth lens has a positive refractive power; the sixth lens has a negative refractive power; the seventh lens may have a positive refractive power or a negative refractive power; the eighth lens has a positive refractive power; the ninth lens may have a positive refractive power or a negative refractive power; and the tenth lens has a negative refractive power. The first lens with the positive refractive power can converge light. The fifth lens with the positive refractive power and the sixth lens with the negative refractive power are carried, so that the refractive power of the camera lens group may be reasonably configured and prevented from being excessively concentrated on one lens, marginal rays may be converged relatively well on an imaging surface, and correction of a coma of the camera lens set is facilitated, and the camera lens group is endowed with relatively high imaging quality. The eighth lens with the positive refractive power is favorable for optimizing a field curvature of a system, reducing a dispersion of the system, and improving field curvature staggering phenomenon of the system. The tenth lens with the negative refractive power is carried, so that an image surface of the system may be enlarged, and meanwhile, a field curvature of the system in an off-axis field of view may be improved.

In an exemplary embodiment, the optical imaging lens assembly of the disclosure may satisfy a conditional expression f×tan($\frac{1}{2}$FOV)>6.0 mm, wherein f is an effective focal length of the optical imaging lens assembly, and FOV is a maximum field of view of the optical imaging lens assembly. f×tan($\frac{1}{2}$FOV) is controlled in a reasonable range, so that an imaging height of the system is enlarged, an excessive aberration of a marginal field of view is simultaneously avoided, enlargement of an aperture of the camera lens group is facilitated, and the characteristics of wide imaging range and high imaging quality are achieved. More specifically, f and FOV may satisfy f×tan($\frac{1}{2}$FOV)≥6.40 mm.

In an exemplary embodiment, the optical imaging lens assembly of the disclosure may satisfy a conditional expression 0.84<f1/(f3+f4)<1.3, wherein f1 is an effective focal length of the first lens, f3 is an effective focal length of the third lens, and f4 is an effective focal length of the fourth lens. The effective focal lengths of the first lens, the third lens and the fourth lens are controlled, so that the size of the system may be reduced effectively on one hand, excessive concentration of the refractive power of the system on a certain lens is avoided on the other hand, and meanwhile, spherical aberration contributions of the three lenses may be controlled in a reasonable range to achieve high imaging quality of the system. More specifically, f1, f3 and f4 may satisfy 1.01≤f1/(f3+f4)≤1.19.

In an exemplary embodiment, the optical imaging lens assembly of the disclosure may satisfy a conditional expression $1.0<(f6+f10)/f9<1.5$, wherein f6 is an effective focal length of the sixth lens, f10 is an effective focal length of the tenth lens, and f9 is an effective focal length of the ninth lens. The effective focal lengths of the sixth lens, the ninth lens and the tenth lens are controlled, so that excessive concentration of the refractive power on a certain lens is avoided, and meanwhile, the sensitivity of the three lenses is reduced favorably to achieve higher machinability. More specifically, f6, f10 and f9 may satisfy $1.09 \le (f6+f10)/f9 \le 1.28$.

In an exemplary embodiment, the optical imaging lens assembly of the disclosure may satisfy a conditional expression $1.0<(R16-R15)/f8<2.0$, wherein R16 is a curvature radius of an image-side surface of the eighth lens, R15 is a curvature radius of an object-side surface of the eighth lens, and f8 is an effective focal length of the eighth lens. A relationship between a surface type and refractive power of the eighth lens is configured reasonably to help to restrict a lens structure of the eighth lens and optimize a chromatic aberration of the system. More specifically, R16, R15 and f8 may satisfy $1.04 \le (R16-R15)/f8 \le 1.74$.

In an exemplary embodiment, the optical imaging lens assembly of the disclosure may satisfy a conditional expression $TTL/ImgH<1.4$, wherein TTL is an on-axis distance from an object-side surface of the first lens to the imaging surface, and ImgH is a half the diagonal length of an effective pixel region on the imaging surface. The conditional expression is controlled reasonably to help to achieve an ultra-large image surface and ultrathin design of a camera lens structure, the ultra-large image surface of the lens is ensured, and meanwhile, the total length of the system is reduced to achieve the ultrathin structure of the lens. More specifically, TTL and ImgH may satisfy $TTL/ImgH \le 1.38$.

In an exemplary embodiment, the optical imaging lens assembly of the disclosure may satisfy a conditional expression $7.0 \text{ mm}<f<10.0 \text{ mm}$, wherein f is the effective focal length of the optical imaging lens assembly. A focal length range of the system is controlled reasonably, so that the image surface size of the imaging system may be enlarged effectively on one hand, and on the other hand, a contribution to a spherical aberration of the system may be controlled in a reasonable range to achieve higher resolving power. More specifically, f may satisfy $7.13 \text{ mm} \le f \le 7.31 \text{ mm}$.

In an exemplary embodiment, the optical imaging lens assembly of the disclosure may satisfy a conditional expression $2.0<(R5+R6)/(R5-R6)<3.0$, wherein R5 is a curvature radius of an object-side surface of the third lens, and R6 is a curvature radius of an image-side surface of the third lens. The conditional expression is controlled reasonably, so that an astigmatism contribution of the third lens may be controlled effectively, and furthermore, the image quality of a middle field of view and an aperture band may be controlled effectively and reasonably. More specifically, R5 and R6 may satisfy $2.05 \le (R5+R6)/(R5-R6) \le 2.81$.

In an exemplary embodiment, the optical imaging lens assembly of the disclosure may satisfy a conditional expression $1.5<R12/R11<2.5$, wherein R12 is a curvature radius of an image-side surface of the sixth lens, and R11 is a curvature radius of an object-side surface of the sixth lens. The curvature radii of the object-side surface and the image-side surface of the sixth lens are configured reasonably, so that the astigmatism and coma between the sixth lens and the lenses thereafter may be balanced effectively. More specifically, R12 and R11 may satisfy $1.83 \le R12/R11 \le 2.05$.

In an exemplary embodiment, the optical imaging lens assembly of the disclosure may satisfy a conditional expression $1.0<(R19+R20)/(R19-R20)<1.5$, wherein R19 is a curvature radius of an object-side surface of the tenth lens, and R20 is a curvature radius of an image-side surface of the tenth lens. The curvature radius of the object-side surface of the tenth lens and the curvature radius of the image-side surface of the tenth lens are controlled to help to improve the image quality of the imaging system, simultaneously keep high machinability of the tenth lens, and improve the practicability of the lens group. More specifically, R19 and R20 may satisfy $1.23 \le (R19+R20)/(R19-R20) \le 1.26$.

In an exemplary embodiment, the optical imaging lens assembly of the disclosure may satisfy a conditional expression $1.2<(CT6+CT7)/CT8<1.6$, wherein CT6 is a center thickness of the sixth lens on the optical axis, CT7 is a center thickness of the seventh lens on the optical axis, and CT8 is a center thickness of the eighth lens on the optical axis. The center thicknesses of the sixth lens, the seventh lens, and the eighth lens are controlled in a reasonable range, so that not only may a distortion of the system be reduced effectively, but also a ghost image risk caused by internal reflection of rays may be reduced. More specifically, CT6, CT7 and CT8 may satisfy $1.37 \le (CT6+CT7)/CT8 \le 1.49$.

In an exemplary embodiment, the optical imaging lens assembly of the disclosure may satisfy a conditional expression $1.5<f67/(f12+f89)<3.0$, wherein f67 is a combined focal length of the sixth lens and the seventh lens, f12 is a combined focal length of the first lens and the second lens, and f89 is a combined focal length of the eighth lens and the ninth lens. Combined refractive power of each lens is configured reasonably to help to implement reasonable spatial distribution of the refractive power of each lens and reduce the aberration of the camera lens. More specifically, f67, f12 and f89 may satisfy $1.61 \le f67/(f12+f89) \le 2.84$.

In an exemplary embodiment, the optical imaging lens assembly of the disclosure may satisfy a conditional expression $1.9<CT5/ET5<3.0$, wherein ET5 is an edge thickness of the fifth lens, and CT5 is a center thickness of the fifth lens on the optical axis. A ratio of the center thickness and edge thickness of the fifth lens is controlled reasonably to help to machine and form the lens. More specifically, ET5 and CT5 may satisfy $1.96 \le CT5/ET5 \le 2.92$.

In an exemplary embodiment, the optical imaging lens assembly of the disclosure may satisfy a conditional expression $0.9<SAG82/SAG81<1.5$, wherein SAG82 is an on-axis distance from an intersection point of the image-side surface of the eighth lens and the optical axis to an effective radius vertex of the image-side surface of the eighth lens, and SAG81 is an on-axis distance from an intersection point of the object-side surface of the eighth lens and the optical axis to an effective radius vertex of the object-side surface of the eighth lens. The conditional expression is controlled in a reasonable range to help to limit a bending degree of the lens and reduce difficulties in machining and forming of the lens. More specifically, SAG82 and SAG81 may satisfy $0.94 \le SAG82/SAG81 \le 1.46$.

In an exemplary embodiment, the lenses are independent of one another, and form air spaces on the optical axis; and at least four lenses in the first lens to the tenth lens are made of a plastic material. The lenses are controlled to be independent of one another and form the air spaces on the optical axis, so that the imaging lens may be formed and assembled better. At least four lenses in the first to tenth lenses are made of the plastic material, so that the weight of the imaging lens may be reduced, and various aberrations may be balanced better.

In an exemplary embodiment, the object-side surface of the sixth lens is a concave surface, and the image-side surface is a convex surface; and the object-side surface of the eighth lens is a concave surface, and the image-side surface is a convex surface. Surface types of the object-side surfaces and image-side surfaces of the sixth lens and the eighth lens are controlled reasonably to help to eliminate the chromatic aberration and optimize the spherical aberration and coma of the system.

In an exemplary embodiment, the optical imaging lens assembly may further include at least one diaphragm. The diaphragm may be arranged at a proper position as required, for example, arranged between the object side and the first lens. Optionally, the optical imaging lens assembly may further include an optical filter configured to correct a chromatic aberration and/or protective glass configured to protect a photosensitive element on the imaging surface.

The optical imaging lens assembly according to the embodiment of the disclosure may adopt multiple lenses, for example, the abovementioned ten. The refractive power and surface types of each lens, the center thickness of each lens, on-axis spacing distances between the lenses, etc., are configured reasonably to endow the optical imaging lens assembly with a relatively large imaging surface and the characteristics of wide imaging range and high imaging quality and ensure an ultrathin design of a mobile phone.

However, those skilled in the art should know that the number of the lenses forming the optical imaging lens assembly may be changed without departing from the technical solutions claimed in the disclosure to achieve each result and advantage described in the specification. For example, although descriptions are made in the implementation with ten lenses as an example, the optical imaging lens assembly is not limited to ten lenses. If necessary, the optical imaging lens assembly may further include another number of lenses.

Specific embodiments applied to the optical imaging lens assembly of the abovementioned embodiment will further be described below with reference to the drawings.

Embodiment 1

FIG. 1 shows a structural schematic diagram of an optical imaging lens assembly according to Embodiment 1 of the disclosure. As shown in FIG. 1, the optical imaging lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a concave surface, and an image-side surface S12 thereof is a convex surface. The seventh lens E7 has a positive refractive power, an object-side surface S13 thereof is a convex surface, and an image-side surface S14 thereof is a convex surface. The eighth lens E8 has a positive refractive power, an object-side surface S15 thereof is a concave surface, and an image-side surface S16 thereof is a convex surface. The ninth lens E9 has a negative refractive power, an object-side surface S17 thereof is a convex surface, and an image-side surface S18 thereof is a concave surface. The tenth lens E10 has a negative refractive power, an object-side surface S19 thereof is a convex surface, and an image-side surface S20 thereof is a concave surface. Light from an object sequentially penetrates through each of the surfaces S1 to S22, and is finally imaged on the imaging surface S23.

Table 1 shows basic parameters of the optical imaging lens assembly of Embodiment 1, wherein the units of the curvature radius, the thickness and the focal length are all millimeters.

TABLE 1

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.2400 | | | | |
| S1 | Aspheric | 3.7457 | 0.6621 | 7.00 | 1.55 | 56.1 | −5.3654 |
| S2 | Aspheric | 203.4420 | 0.0500 | | | | −99.0000 |
| S3 | Aspheric | 16.4036 | 0.2100 | −31.63 | 1.55 | 56.1 | 48.3707 |
| S4 | Aspheric | 8.3623 | 0.2446 | | | | 11.6229 |
| S5 | Aspheric | 7.2810 | 0.2100 | −10.28 | 1.64 | 23.3 | −17.1253 |
| S6 | Aspheric | 3.4159 | 0.2395 | | | | −5.7025 |
| S7 | Aspheric | 5.7623 | 0.6694 | 16.79 | 1.55 | 56.1 | −0.8349 |
| S8 | Aspheric | 14.9564 | 0.3138 | | | | −77.9057 |
| S9 | Aspheric | 8.1593 | 0.7318 | 11.31 | 1.55 | 56.1 | −34.6672 |
| S10 | Aspheric | −24.3337 | 0.6623 | | | | 82.1385 |
| S11 | Aspheric | −2.9934 | 0.2275 | −10.69 | 1.64 | 23.3 | −1.8960 |
| S12 | Aspheric | −5.4824 | 0.1026 | | | | −4.1340 |
| S13 | Aspheric | 6.1650 | 0.6214 | 8.77 | 1.55 | 56.1 | −8.3756 |
| S14 | Aspheric | −20.4084 | 0.5735 | | | | 35.8248 |
| S15 | Aspheric | −7.4221 | 0.6176 | 5.12 | 1.55 | 56.1 | 4.1670 |
| S16 | Aspheric | −2.0843 | 0.1056 | | | | −6.0286 |
| S17 | Aspheric | 237.4773 | 0.2434 | −13.16 | 1.55 | 56.1 | −99.0000 |
| S18 | Aspheric | 6.9533 | 0.3259 | | | | −5.0924 |
| S19 | Aspheric | 14.7651 | 0.2886 | −3.62 | 1.55 | 56.1 | 7.1039 |
| S20 | Aspheric | 1.7269 | 0.9438 | | | | −4.6652 |

TABLE 1-continued

| Surface number | Surface type | Curvature radius | Thickness | Focal length | Refractive index | Abbe number | Conic coefficient |
|---|---|---|---|---|---|---|---|
| S21 | Spherical | Infinite | 0.2500 | | 1.52 | 64.2 | |
| S22 | Spherical | Infinite | 0.2249 | | | | |
| S23 | Spherical | Infinite | | | | | |

In Embodiment 1, a value of a total effective focal length f of the optical imaging lens assembly is 7.13 mm, a value of an on-axis distance TTL from the object-side surface S1 of the first lens E1 to the imaging surface S23 is 8.52 mm, and ImgH is a half of a diagonal length of an effective pixel region on the imaging surface S23, and a value of ImgH is 6.19 mm.

In Embodiment 1, for the effective focal length f of the optical imaging lens assembly and a maximum field of view FOV of the optical imaging lens assembly, there is a relational expression f×tan(½FOV)=6.40, satisfying f×tan(½FOV)>6.0 mm.

In Embodiment 1, for an effective focal length f1 of the first lens, an effective focal length f3 of the third lens, and an effective focal length f4 of the fourth lens, there is a relational expression f1/(f3+f4)=1.08, satisfying 0.8<f1/(f3+f4)<1.3.

In Embodiment 1, for an effective focal length f6 of the sixth lens, an effective focal length f10 of the tenth lens, and an effective focal length f9 of the ninth lens, there is a relational expression (f6+f10)/f9=1.09, satisfying 1.0<(f6+f10)/f9<1.5.

In Embodiment 1, for a curvature radius R16 of the image-side surface of the eighth lens, a curvature radius R15 of the object-side surface of the eighth lens, and an effective focal length f8 of the eighth lens, there is a relational expression (R16−R15)/f8=1.04, satisfying 1.0<(R16−R15)/f8<2.0.

In Embodiment 1, ImgH is a half of a diagonal length of an effective pixel region on the imaging surface of the optical imaging lens assembly, and for the on-axis distance TTL from the object-side surface of the first lens to the imaging surface and ImgH, there is a relational expression TTL/ImgH=1.38, satisfying TTL/ImgH<1.4.

In Embodiment 1, for the effective focal length f of the optical imaging lens assembly, f=7.13, satisfying 7.0 mm<f<10.0 mm.

In Embodiment 1, for a curvature radius R5 of the object-side surface of the third lens and a curvature radius R6 of the image-side surface of the third lens, there is a relational expression (R5+R6)/(R5−R6)=2.77, satisfying 2.0<(R5+R6)/(R5−R6)<3.0.

In Embodiment 1, for a curvature radius R12 of the image-side surface of the sixth lens and a curvature radius R11 of the object-side surface of the sixth lens, there is a relational expression R12/R11=1.83, satisfying 1.5<R12/R11<2.5.

In Embodiment 1, for a curvature radius R19 of the object-side surface of the tenth lens and a curvature radius R20 of the image-side surface of the tenth lens, there is a relational expression (R19+R20)/(R19−R20)=1.26, satisfying 1.0<(R19+R20)/(R19−R20)<1.5.

In Embodiment 1, for a center thickness CT6 of the sixth lens on the optical axis, a center thickness CT7 of the seventh lens on the optical axis, and a center thickness CT8 of the eighth lens on the optical axis, there is a relational expression (CT6+CT7)/CT8=1.37, satisfying 1.2<(CT6+CT7)/CT8<1.6.

In Embodiment 1, for a combined focal length f67 of the sixth lens and the seventh lens, a combined focal length f12 of the first lens and the second lens, and a combined focal length f89 of the eighth lens and the ninth lens, there is a relational expression f67/(f12+f89)=2.27, satisfying 1.5<f67/(f12+f89)<3.0.

In Embodiment 1, for an edge thickness ET5 of the fifth lens and a center thickness CT5 of the fifth lens on the optical axis, there is a relational expression CT5/ET5=2.83, satisfying 1.9<CT5/ET5<3.0.

In Embodiment 1, for an on-axis distance SAG82 from an intersection point of the image-side surface of the eighth lens and the optical axis to an effective radius vertex of the image-side surface of the eighth lens and an on-axis distance SAG81 from an intersection point of the object-side surface of the eighth lens and the optical axis to an effective radius vertex of the object-side surface of the eighth lens, there is a relational expression SAG82/SAG81=1.03, satisfying 0.9<SAG82/SAG81<1.5.

The following Table 2 shows higher-order coefficients A4, A6, A8, A10, A12, A14, A16 and A18 applied to each of the aspheric mirror surfaces S1-S20 of the aspheric lenses in Embodiment 1 of the disclosure.

TABLE 2

| Surface number | A4 | A6 | A8 | A10 | A12 | A14 | A16 | A18 |
|---|---|---|---|---|---|---|---|---|
| S1 | 1.9689E−02 | −2.6764E−02 | 3.4208E−02 | −2.5458E−02 | 9.9569E−03 | −1.9597E−03 | 1.4646E−04 | 0.0000E+00 |
| S2 | −4.3054E−03 | −9.1726E−04 | 2.2373E−02 | −3.1207E−02 | 1.7396E−02 | −4.5287E−03 | 4.4973E−04 | 0.0000E+00 |
| S3 | −2.7242E−03 | −1.1339E−02 | 4.4966E−02 | −4.8175E−02 | 2.4769E−02 | −6.1823E−03 | 6.0078E−04 | 0.0000E+00 |
| S4 | −1.0142E−02 | −1.1339E−02 | 3.6688E−02 | −3.8889E−02 | 2.1650E−02 | −6.0349E−03 | 6.6107E−04 | 0.0000E+00 |
| S5 | −2.7400E−02 | 4.8284E−03 | 7.3855E−04 | −2.2799E−03 | 2.7754E−03 | −1.2820E−03 | 1.9120E−04 | 0.0000E+00 |
| S6 | −1.9135E−02 | 1.9904E−02 | −2.0656E−02 | 1.5105E−02 | −6.0814E−03 | 1.2192E−03 | −9.6084E−05 | 0.0000E+00 |
| S7 | −3.8729E−03 | 6.2176E−03 | −6.7260E−03 | 3.7617E−03 | −1.2022E−03 | 1.9567E−04 | −1.2625E−05 | 0.0000E+00 |
| S8 | −1.9029E−02 | 8.3342E−03 | −2.6333E−03 | 1.7393E−04 | 9.7588E−05 | −2.8589E−05 | 2.2407E−06 | 0.0000E+00 |
| S9 | −1.9542E−02 | 8.9402E−03 | −8.0611E−03 | 3.5598E−03 | −8.3980E−04 | 8.9366E−05 | −7.5320E−07 | −3.8692E−07 |
| S10 | −1.3450E−02 | −3.8926E−03 | 3.8794E−03 | −2.5568E−03 | 9.0206E−04 | −1.7567E−04 | 1.7704E−05 | −7.0712E−07 |
| S11 | 2.2766E−02 | −5.8109E−03 | 4.9632E−04 | −2.5185E−04 | 1.6394E−04 | −4.2466E−05 | 5.1293E−06 | −2.4100E−07 |
| S12 | 1.2442E−02 | −7.0048E−03 | 3.6285E−03 | −1.5501E−03 | 4.1107E−04 | −6.2802E−05 | 5.1864E−06 | −1.8000E−07 |
| S13 | −8.2627E−03 | −4.1797E−03 | 2.6684E−03 | −9.6469E−04 | 2.0749E−04 | −2.6002E−05 | 1.7328E−06 | −4.7352E−08 |
| S14 | 6.0105E−03 | −3.6809E−03 | 6.5624E−04 | −2.1550E−04 | 6.9831E−05 | −1.1426E−05 | 8.7845E−07 | −2.5702E−08 |

TABLE 2-continued

| Surface number | A4 | A6 | A8 | A10 | A12 | A14 | A16 | A18 |
|---|---|---|---|---|---|---|---|---|
| S15 | −2.7724E−03 | 7.5363E−03 | −4.7953E−03 | 1.3548E−03 | −2.1205E−04 | 1.9445E−05 | −1.0065E−06 | 2.3272E−08 |
| S16 | −3.8676E−03 | 3.7768E−03 | −1.7206E−03 | 4.4937E−04 | −6.5243E−05 | 5.2562E−06 | −2.2156E−07 | 3.8342E−09 |
| S17 | −6.7137E−03 | −3.3376E−03 | 1.1863E−03 | −2.2312E−04 | 2.5840E−05 | −1.7882E−06 | 6.7696E−08 | −1.0747E−09 |
| S18 | −1.0617E−02 | 1.4110E−03 | −1.2721E−04 | 6.5451E−06 | −1.4414E−07 | −1.7409E−09 | 1.3589E−10 | −1.7241E−12 |
| S19 | −2.2516E−02 | 4.2444E−03 | −4.1327E−04 | 2.1725E−05 | −5.2241E−07 | −2.2951E−09 | 3.8891E−10 | −5.8916E−12 |
| S20 | −1.7764E−02 | 2.4587E−03 | −1.9571E−04 | 6.9289E−06 | 7.2477E−08 | −1.5245E−08 | 4.9466E−10 | −5.4642E−12 |

Figure 2:
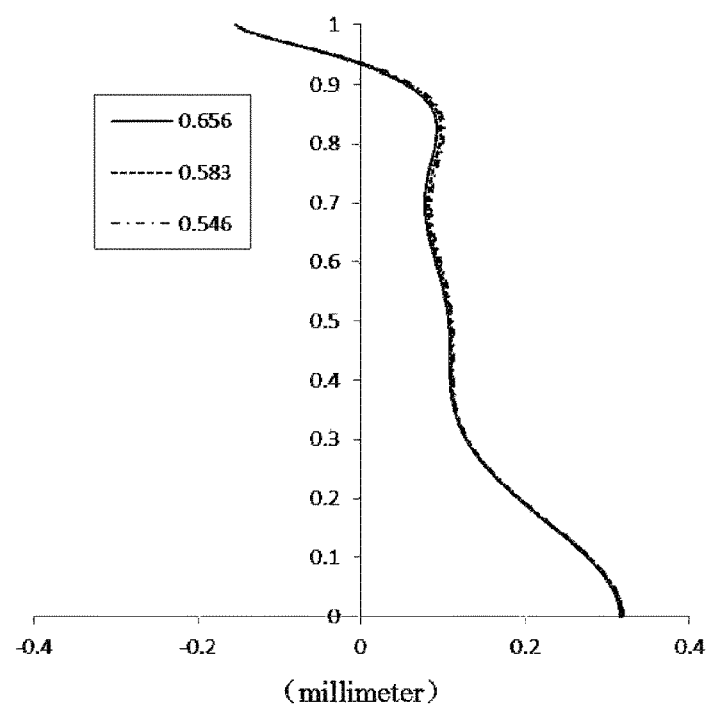
FIGS. 2-5 show a longitudinal aberration curve, an astigmatism curve, a distortion curve and a lateral color curve of an optical imaging lens assembly according to Embodiment 1 of the disclosure.
Figure 3:
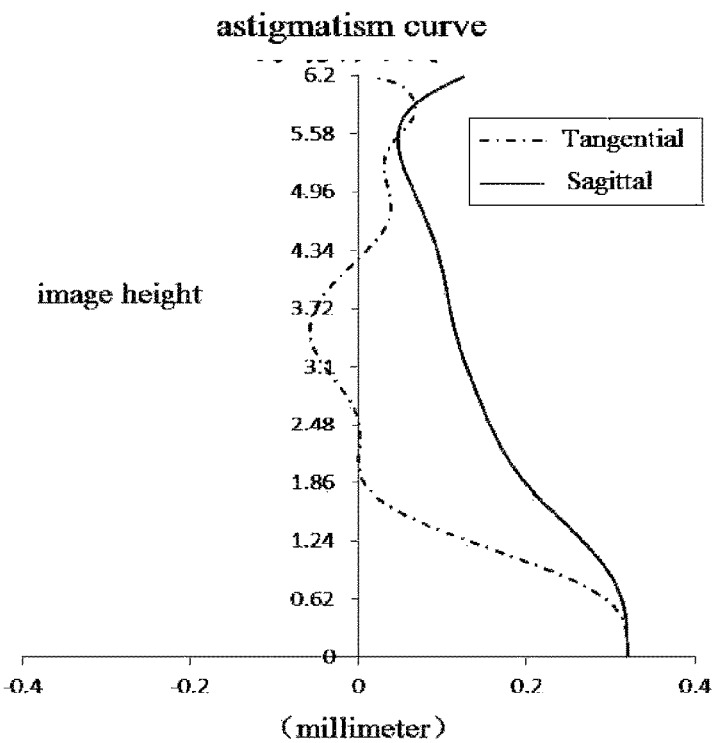
Figure 4:
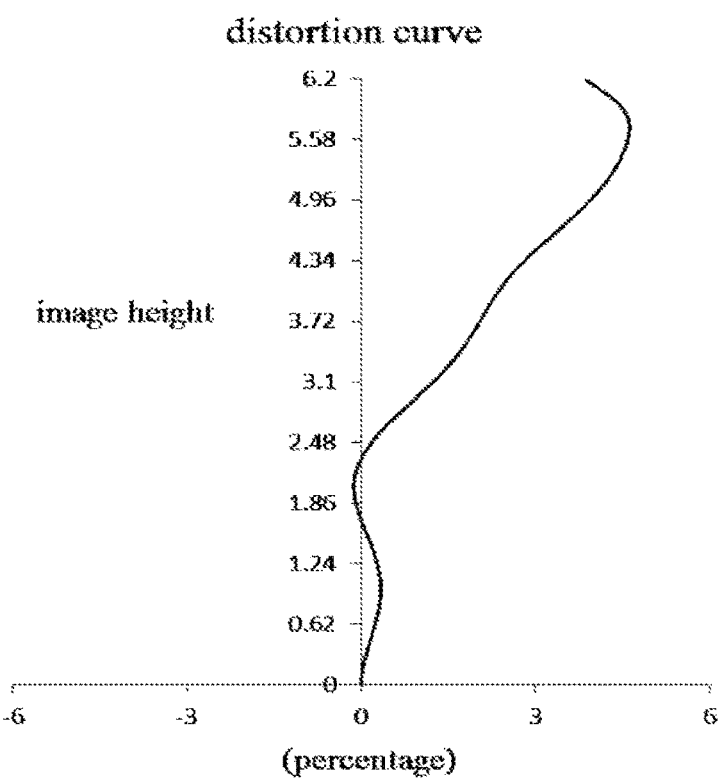
Figure 5:
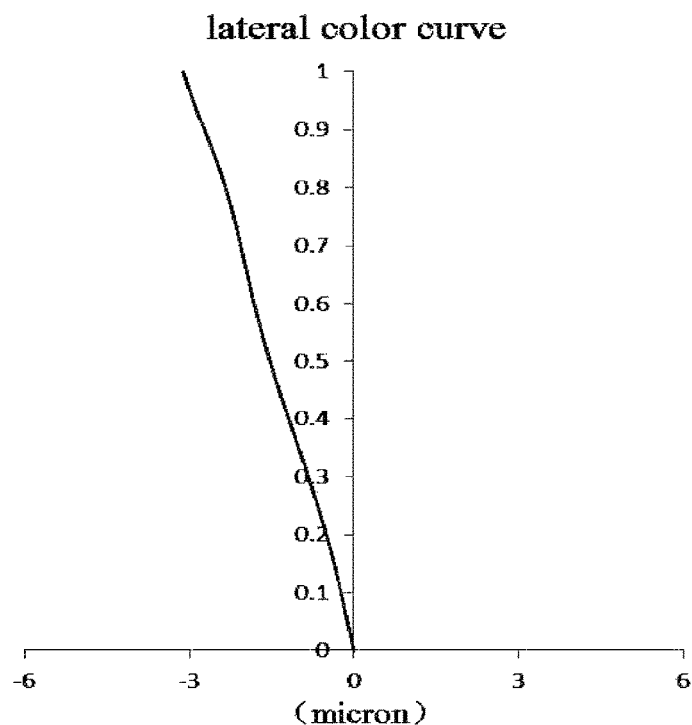

FIG. 2 shows a longitudinal aberration curve of the optical imaging lens assembly according to Embodiment 1 to represent deviation of a convergence focal point after light with different wavelengths passes through the lens. FIG. 3 shows an astigmatism curve of the optical imaging lens assembly according to Embodiment 1 to represent a curvature of tangential image surface and a curvature of sagittal image surface. FIG. 4 shows a distortion curve of the optical imaging lens assembly according to Embodiment 2 to represent distortion values corresponding to different image heights. FIG. 5 shows a lateral color curve of the optical imaging lens assembly according to Embodiment 2 to represent deviation of different image heights on the imaging surface after the light passes through the lens. According to FIGS. 2-5, it can be seen that the optical imaging lens assembly provided in Embodiment 1 may achieve high imaging quality.

Embodiment 2

Figure 6:
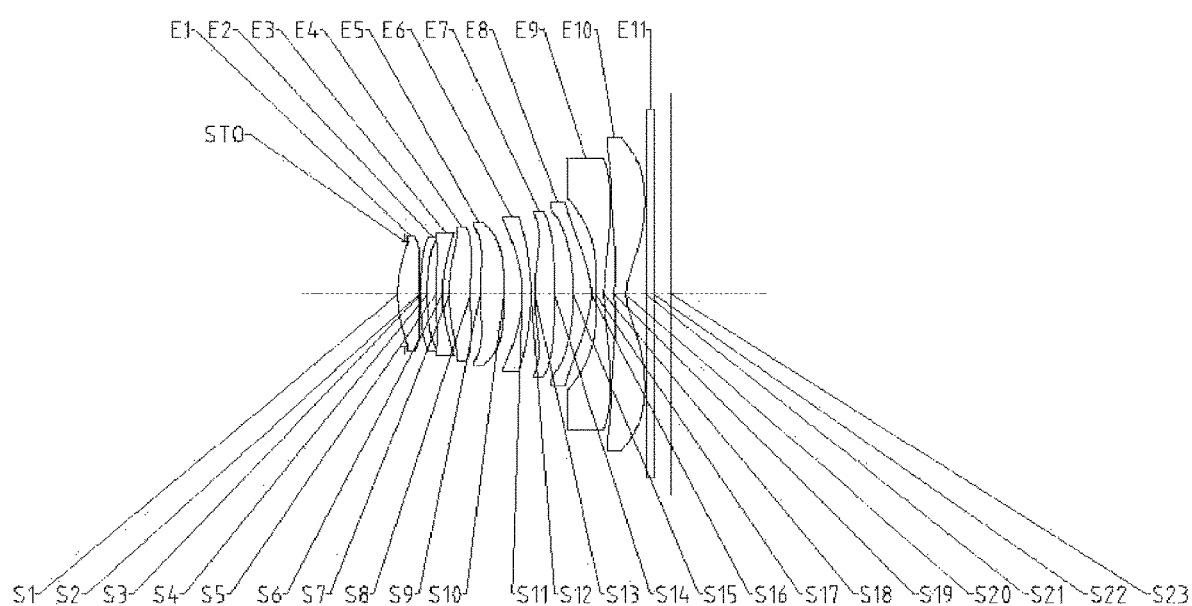
FIG. 6 shows a structural schematic diagram of an optical imaging lens assembly according to Embodiment 2 of the disclosure.

FIG. 6 shows a structural schematic diagram of an optical imaging lens assembly according to Embodiment 2 of the disclosure. As shown in FIG. 6, the optical imaging lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a concave surface, and an image-side surface S12 thereof is a convex surface. The seventh lens E7 has a positive refractive power, an object-side surface S13 thereof is a convex surface, and an image-side surface S14 thereof is a convex surface. The eighth lens E8 has a positive refractive power, an object-side surface S15 thereof is a concave surface, and an image-side surface S16 thereof is a convex surface. The ninth lens E9 has a negative refractive power, an object-side surface S17 thereof is a concave surface, and an image-side surface S18 thereof is a concave surface. The tenth lens E10 has a negative refractive power, an object-side surface S19 thereof is a convex surface, and an image-side surface S20 thereof is a concave surface. Light from an object sequentially penetrates through each of the surfaces S1 to S22, and is finally imaged on the imaging surface S23.

Table 3 shows basic parameters of the optical imaging lens assembly of Embodiment 2, wherein the units of the curvature radius, the thickness and the focal length are all millimeters.

TABLE 3

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.2400 | | | | |
| S1 | Aspheric | 3.6831 | 0.6818 | 6.99 | 1.55 | 56.1 | −5.3502 |
| S2 | Aspheric | 109.2757 | 0.0500 | | | | −99.0000 |
| S3 | Aspheric | 13.7175 | 0.2100 | −30.98 | 1.55 | 56.1 | 48.1553 |
| S4 | Aspheric | 7.5240 | 0.2614 | | | | 11.8544 |
| S5 | Aspheric | 7.4586 | 0.2100 | −10.76 | 1.64 | 23.3 | −17.6660 |
| S6 | Aspheric | 3.5401 | 0.2216 | | | | −5.7152 |
| S7 | Aspheric | 5.9636 | 0.6634 | 16.64 | 1.55 | 56.1 | −1.0746 |
| S8 | Aspheric | 16.7713 | 0.3044 | | | | −63.1954 |
| S9 | Aspheric | 8.6949 | 0.7469 | 11.82 | 1.55 | 56.1 | −35.6372 |
| S10 | Aspheric | −24.0213 | 0.5982 | | | | 83.2162 |
| S11 | Aspheric | −3.1240 | 0.2562 | −10.07 | 1.64 | 23.3 | −1.8873 |
| S12 | Aspheric | −6.2595 | 0.1147 | | | | −4.2934 |
| S13 | Aspheric | 5.8119 | 0.6324 | 8.55 | 1.55 | 56.1 | −2.4739 |
| S14 | Aspheric | −22.5078 | 0.5846 | | | | 36.4820 |
| S15 | Aspheric | −7.6167 | 0.5953 | 5.08 | 1.55 | 56.1 | 4.1920 |
| S16 | Aspheric | −2.0832 | 0.1381 | | | | −6.0209 |
| S17 | Aspheric | −85.8487 | 0.2609 | −11.88 | 1.55 | 56.1 | 99.0000 |
| S18 | Aspheric | 6.9983 | 0.3282 | | | | −5.0924 |
| S19 | Aspheric | 14.9499 | 0.3657 | −3.35 | 1.55 | 56.1 | 7.0434 |
| S20 | Aspheric | 1.6104 | 0.6287 | | | | −4.6036 |

TABLE 3-continued

| Surface number | Surface type | Curvature radius | Thickness | Focal length | Refractive index | Abbe number | Conic coefficient |
|---|---|---|---|---|---|---|---|
| S21 | Spherical | Infinite | 0.2500 | | 1.52 | 64.2 | |
| S22 | Spherical | Infinite | 0.5498 | | | | |
| S23 | Spherical | Infinite | | | | | |

In Embodiment 2, a value of a total effective focal length f of the optical imaging lens assembly is 7.20 mm, a value of an on-axis distance TTL from the object-side surface S1 of the first lens E1 to the imaging surface S23 is 8.65 mm, and ImgH is a half of a diagonal length of an effective pixel region on the imaging surface S23, and a value of ImgH is 6.35 mm.

The following Table 4 shows higher-order coefficients A4, A6, A8, A10, A12, A14, A16 and A18 applied to each of the aspheric mirror surfaces S1-S20 of the aspheric lenses in Embodiment 2 of the disclosure.

TABLE 4

| Surface number | A4 | A6 | A8 | A10 | A12 | A14 | A16 | A18 |
|---|---|---|---|---|---|---|---|---|
| S1 | 1.6923E−02 | −1.7847E−02 | 2.0538E−02 | −1.3781E−02 | 4.5218E−03 | −6.8767E−04 | 2.9719E−05 | 0.0000E+00 |
| S2 | −5.0230E−03 | 4.2397E−03 | 7.6378E−03 | −1.3987E−02 | 7.6633E−03 | −1.8919E−03 | 1.7527E−04 | 0.0000E+00 |
| S3 | −5.9182E−03 | 4.4325E−03 | 1.3737E−02 | −1.8001E−02 | 9.4620E−03 | −2.2675E−03 | 2.0271E−04 | 0.0000E+00 |
| S4 | −1.5918E−02 | 1.8072E−02 | −1.9288E−02 | 1.3919E−02 | −4.9046E−03 | 8.0710E−04 | −5.0070E−05 | 0.0000E+00 |
| S5 | −3.0942E−02 | 1.7855E−02 | −2.0063E−02 | 1.5862E−02 | −6.1322E−03 | 1.0200E−03 | −5.1974E−05 | 0.0000E+00 |
| S6 | −1.8917E−02 | 1.8060E−02 | −1.7412E−02 | 1.2455E−02 | −4.9210E−03 | 9.5681E−04 | −7.2208E−05 | 0.0000E+00 |
| S7 | −3.5387E−03 | 4.4254E−03 | −3.7084E−03 | 1.5561E−03 | −3.8023E−04 | 4.2709E−05 | −1.3441E−06 | 0.0000E+00 |
| S8 | −1.7169E−02 | 4.8983E−03 | 5.4940E−04 | −1.5033E−03 | 5.9903E−04 | −1.0761E−04 | 7.3318E−06 | 0.0000E+00 |
| S9 | −1.8235E−02 | 6.8923E−03 | −7.3133E−03 | 3.9489E−03 | −1.2491E−03 | 2.2663E−04 | −2.1750E−05 | 8.5110E−07 |
| S10 | −1.4373E−02 | −2.6152E−03 | 2.4573E−03 | −1.6534E−03 | 5.6163E−04 | −1.0151E−04 | 9.0971E−06 | −2.9507E−07 |
| S11 | 2.3320E−02 | −6.5709E−03 | 7.9472E−04 | −1.5724E−04 | 6.3304E−05 | −1.3755E−05 | 1.5507E−06 | −7.2915E−08 |
| S12 | 1.1714E−02 | −5.5949E−03 | 2.4459E−03 | −1.0642E−03 | 3.0209E−04 | −4.9260E−05 | 4.3217E−06 | −1.5833E−07 |
| S13 | −1.1992E−02 | −2.1187E−03 | 2.1693E−03 | −1.0662E−03 | 2.7705E−04 | −3.8831E−05 | 2.7653E−06 | −7.8591E−08 |
| S14 | 2.5920E−03 | 1.7128E−03 | −2.9178E−03 | 1.0815E−03 | −2.0731E−04 | 2.3066E−05 | −1.4192E−06 | 3.7348E−08 |
| S15 | −9.1577E−03 | 1.4309E−02 | −8.3642E−03 | 2.3999E−03 | −3.8546E−04 | 3.5196E−05 | −1.7083E−06 | 3.4253E−08 |
| S16 | −3.9107E−03 | 4.8954E−03 | −2.4839E−03 | 6.5277E−04 | −9.2228E−05 | 7.1145E−06 | −2.8309E−07 | 4.5571E−09 |
| S17 | −8.6145E−03 | −6.5941E−03 | 3.0303E−03 | −7.1235E−04 | 9.8700E−05 | −7.9404E−06 | 3.4283E−07 | −6.1363E−09 |
| S18 | −1.0617E−02 | 1.4110E−03 | −1.2721E−04 | 6.5451E−06 | −1.4414E−07 | −1.7409E−09 | 1.3589E−10 | −1.7241E−12 |
| S19 | −2.2447E−02 | 4.2545E−03 | −4.1338E−04 | 2.1451E−05 | −4.9528E−07 | −3.3230E−09 | 4.0158E−10 | −5.8066E−12 |
| S20 | −2.2871E−02 | 3.9727E−03 | −4.5575E−04 | 3.3095E−05 | −1.4535E−06 | 3.4981E−08 | −3.6595E−10 | 4.7910E−13 |

Figure 7:
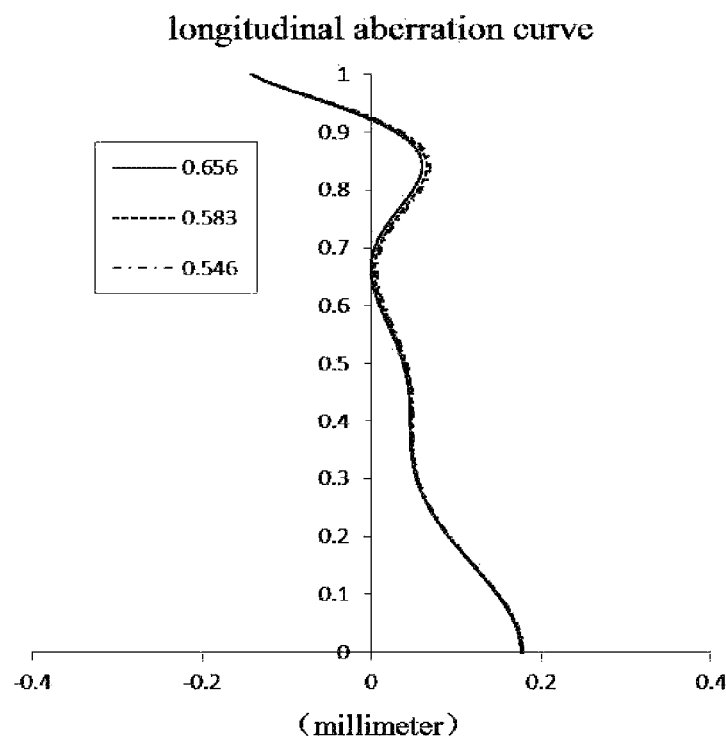
FIGS. 7-10 show a longitudinal aberration curve, an astigmatism curve, a distortion curve and a lateral color curve of an optical imaging lens assembly according to Embodiment 2 of the disclosure.
Figure 8:
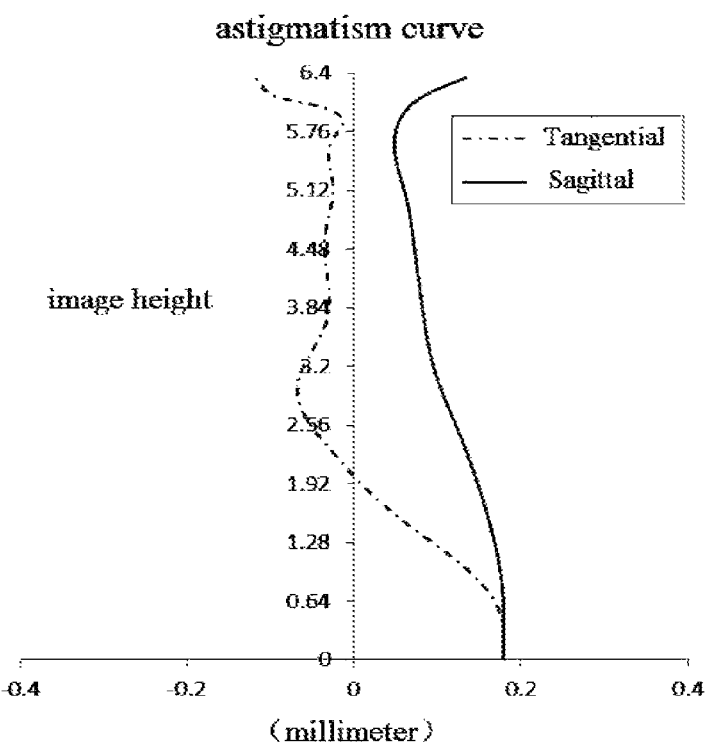
Figure 9:
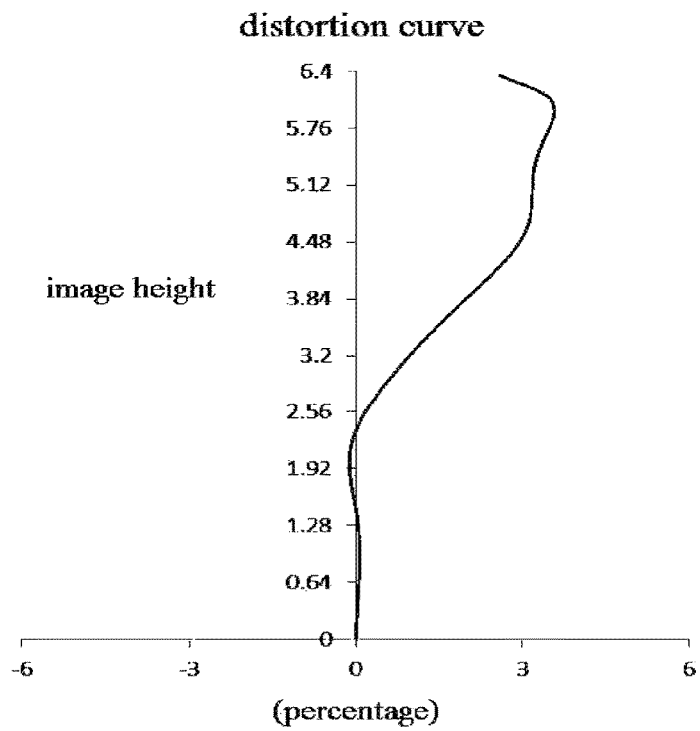
Figure 10:
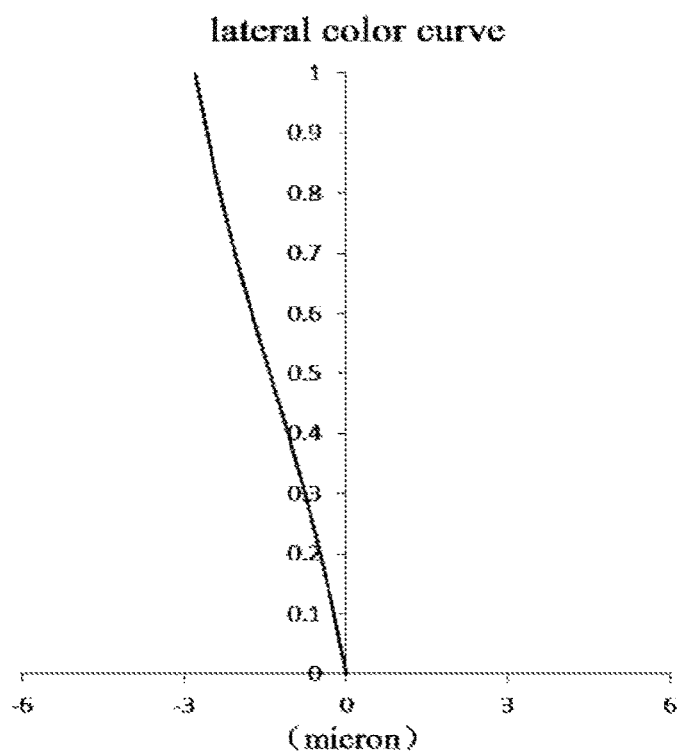

FIG. 7 shows a longitudinal aberration curve of the optical imaging lens assembly according to Embodiment 2 of the disclosure to represent deviation of a convergence focal point after light with different wavelengths passes through the lens. FIG. 8 shows an astigmatism curve of the optical imaging lens assembly according to Embodiment 2 of the disclosure to represent a curvature of tangential image surface and a curvature of sagittal image surface. FIG. 9 shows a distortion curve of the optical imaging lens assembly according to Embodiment 2 of the disclosure to represent distortion values corresponding to different image heights. FIG. 10 shows a lateral color curve of the optical imaging lens assembly according to Embodiment 2 of the disclosure to represent deviation of different image heights on the imaging surface after the light passes through the lens. According to FIGS. 7-10, it can be seen that the optical imaging lens assembly provided in Embodiment 2 of the disclosure may achieve high imaging quality.

Embodiment 3

Figure 11:
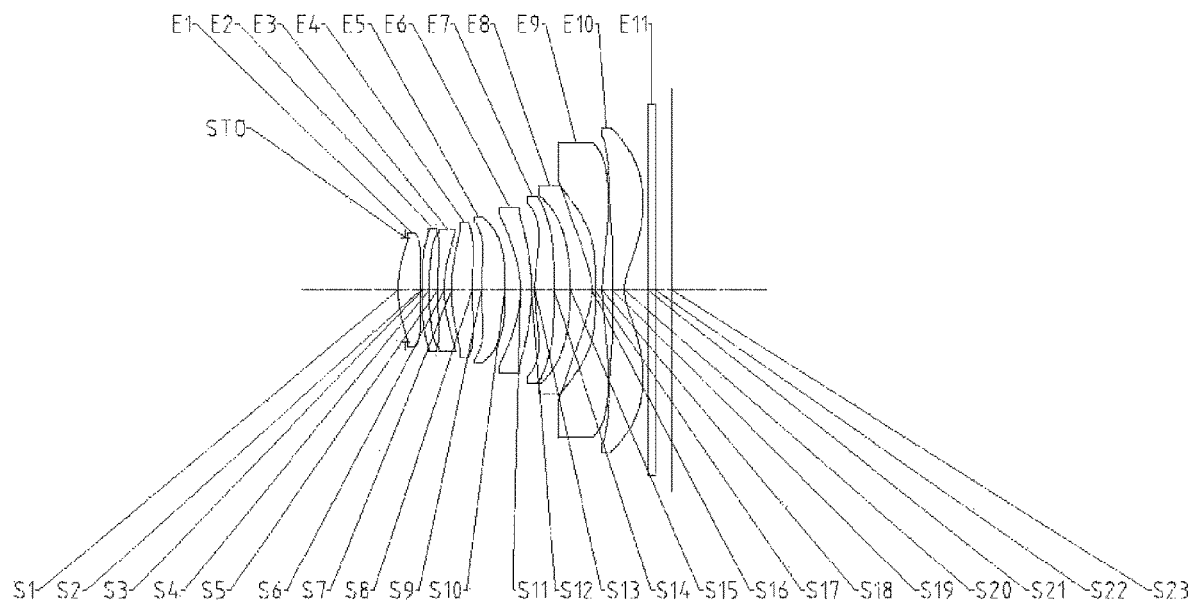
FIG. 11 shows a structural schematic diagram of an optical imaging lens assembly according to Embodiment 3 of the disclosure.

FIG. 11 shows a structural schematic diagram of an optical imaging lens assembly according to Embodiment 3 of the disclosure. As shown in FIG. 11, the optical imaging lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a concave surface, and an image-side surface S12 thereof is a convex surface. The seventh lens E7 has a positive refractive power, an object-side surface S13 thereof is a convex surface, and an image-side surface S14 thereof is a convex surface. The eighth lens E8 has a positive refractive power, an object-side surface S15 thereof is a concave surface, and an image-side surface S16 thereof is a convex surface. The ninth lens E9 has a negative refractive power, an object-side surface S17 thereof is a concave surface, and an image-side surface S18 thereof is a concave surface. The tenth lens E10 has a negative refractive power, an object-side surface S19 thereof is a convex surface, and an image-side surface S20 thereof is a concave surface. Light from an object sequentially penetrates through each of the surfaces S1 to S22, and is finally imaged on the imaging surface S23.

Table 5 shows basic parameters of the optical imaging lens assembly of Embodiment 3, wherein the units of the curvature radius, the thickness and the focal length are all millimeters.

TABLE 5

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.2400 | | | | |
| S1 | Aspheric | 3.7237 | 0.7172 | 6.56 | 1.55 | 56.1 | −5.5729 |
| S2 | Aspheric | −81.2130 | 0.0500 | | | | −89.0299 |
| S3 | Aspheric | 17.8320 | 0.2100 | −32.14 | 1.55 | 56.1 | 49.0955 |
| S4 | Aspheric | 8.7945 | 0.2703 | | | | 11.5200 |
| S5 | Aspheric | 8.6952 | 0.2100 | −9.57 | 1.64 | 23.3 | −16.2423 |
| S6 | Aspheric | 3.5583 | 0.2280 | | | | −5.7316 |
| S7 | Aspheric | 5.5288 | 0.6585 | 15.48 | 1.55 | 56.1 | −1.4113 |
| S8 | Aspheric | 15.4059 | 0.2882 | | | | −50.6555 |
| S9 | Aspheric | 8.3147 | 0.7327 | 11.34 | 1.55 | 56.1 | −32.6146 |
| S10 | Aspheric | −23.1924 | 0.4967 | | | | 78.3141 |
| S11 | Aspheric | −2.9898 | 0.3426 | −9.73 | 1.64 | 23.3 | −1.8934 |
| S12 | Aspheric | −6.0113 | 0.1093 | | | | −4.2536 |
| S13 | Aspheric | 5.7294 | 0.5983 | 8.55 | 1.55 | 56.1 | −3.7193 |
| S14 | Aspheric | −23.9014 | 0.5263 | | | | 43.3957 |
| S15 | Aspheric | −8.0005 | 0.6850 | 4.92 | 1.55 | 56.1 | 4.1784 |
| S16 | Aspheric | −2.0673 | 0.1057 | | | | −6.0325 |
| S17 | Aspheric | −80.4316 | 0.2240 | −11.80 | 1.55 | 56.1 | −60.1591 |
| S18 | Aspheric | 6.9901 | 0.3190 | | | | −5.0924 |
| S19 | Aspheric | 14.9317 | 0.3853 | −3.23 | 1.55 | 56.1 | 7.0701 |
| S20 | Aspheric | 1.5601 | 0.7253 | | | | −4.4793 |
| S21 | Spherical | Infinite | 0.2500 | | 1.52 | 64.2 | |
| S22 | Spherical | Infinite | 0.5132 | | | | |
| S23 | Spherical | Infinite | | | | | |

In Embodiment 3, a value of a total effective focal length f of the optical imaging lens assembly is 7.26 mm, a value of an on-axis distance TTL from the object-side surface S1 of the first lens E1 to the imaging surface S23 is 8.65 mm, and ImgH is a half of a diagonal length of an effective pixel region on the imaging surface S23, and a value of ImgH is 6.38 mm.

The following Table 6 shows higher-order coefficients A4, A6, A8, A10, A12, A14, A16 and A18 applied to each of the aspheric mirror surfaces S1-S20 of the aspheric lenses in Embodiment 3 of the disclosure.

TABLE 6

| Surface number | A4 | A6 | A8 | A10 | A12 | A14 | A16 | A18 |
|---|---|---|---|---|---|---|---|---|
| S1 | 1.8132E−02 | −1.9872E−02 | 1.9379E−02 | −1.0008E−02 | 1.7833E−03 | 1.5721E−04 | −6.6996E−05 | 0.0000E+00 |
| S2 | −6.0799E−03 | 1.1434E−02 | −6.6949E−03 | −1.1657E−04 | 5.7972E−04 | −6.1188E−05 | −1.2175E−05 | 0.0000E+00 |
| S3 | −7.3605E−03 | 1.0029E−02 | 3.5081E−03 | −8.6635E−03 | 4.9519E−03 | −1.1672E−03 | 9.6446E−05 | 0.0000E+00 |
| S4 | −1.5152E−02 | 1.5168E−02 | −1.4082E−02 | 8.7069E−03 | −2.0383E−03 | −9.0789E−06 | 4.2861E−05 | 0.0000E+00 |
| S5 | −3.1605E−02 | 2.1545E−02 | −2.3887E−02 | 1.7197E−02 | −5.9601E−03 | 8.1798E−04 | −1.8342E−05 | 0.0000E+00 |
| S6 | −1.7614E−02 | 1.5904E−02 | −1.4530E−02 | 9.9560E−03 | −3.7919E−03 | 7.1168E−04 | −5.1841E−05 | 0.0000E+00 |
| S7 | −4.2632E−03 | 6.3438E−03 | −6.2053E−03 | 3.1357E−03 | −8.9818E−04 | 1.2936E−04 | −7.3077E−06 | 0.0000E+00 |
| S8 | −1.7910E−02 | 7.0200E−03 | −1.3488E−03 | −6.3352E−04 | 3.8591E−04 | −8.2097E−05 | 6.2680E−06 | 0.0000E+00 |
| S9 | −1.8723E−02 | 9.5266E−03 | −1.1039E−02 | 6.3787E−03 | −2.1145E−03 | 3.9897E−04 | −3.9623E−05 | 1.5889E−06 |
| S10 | −1.4101E−02 | −2.9487E−03 | 2.4996E−03 | −1.6241E−03 | 5.6502E−04 | −1.0767E−04 | 1.0484E−05 | −3.9166E−07 |
| S11 | 2.3291E−02 | −6.3879E−03 | 1.2427E−03 | −7.8160E−04 | 3.7550E−04 | −9.0403E−05 | 1.0808E−05 | −5.1212E−07 |
| S12 | 1.2148E−02 | −6.4819E−03 | 3.0934E−03 | −1.3362E−03 | 3.7117E−04 | −5.9693E−05 | 5.1988E−06 | −1.9027E−07 |
| S13 | −1.2424E−02 | −2.3675E−03 | 2.3617E−03 | −1.1626E−03 | 3.0262E−04 | −4.2632E−05 | 3.0612E−06 | −8.7885E−08 |
| S14 | 2.7637E−03 | 1.5391E−03 | −2.8536E−03 | 1.0623E−03 | −2.0120E−04 | 2.1827E−05 | −1.2953E−06 | 3.2628E−08 |
| S15 | −1.0833E−02 | 1.4812E−02 | −8.5894E−03 | 2.5005E−03 | −4.0973E−04 | 3.8249E−05 | −1.8996E−06 | 3.8979E−08 |
| S16 | −3.3637E−03 | 4.0661E−03 | −2.0455E−03 | 5.3853E−04 | −7.5885E−05 | 5.7973E−06 | −2.2687E−07 | 3.5681E−09 |
| S17 | −8.6643E−03 | −6.5584E−03 | 2.8545E−03 | −6.4833E−04 | 8.8479E−05 | −7.0859E−06 | 3.0667E−07 | −5.5343E−09 |
| S18 | −1.0617E−02 | 1.4110E−03 | −1.2721E−04 | 6.5451E−06 | −1.4414E−07 | −1.7409E−09 | 1.3589E−10 | −1.7241E−12 |
| S19 | −2.2096E−02 | 4.1476E−03 | −3.9924E−04 | 2.0703E−05 | −5.0209E−07 | −8.6580E−10 | 3.0289E−10 | −4.5140E−12 |
| S20 | −2.3181E−02 | 3.9967E−03 | −4.6769E−04 | 3.4544E−05 | −1.5379E−06 | 3.7720E−08 | −4.1174E−10 | 7.5461E−13 |

Figure 12:
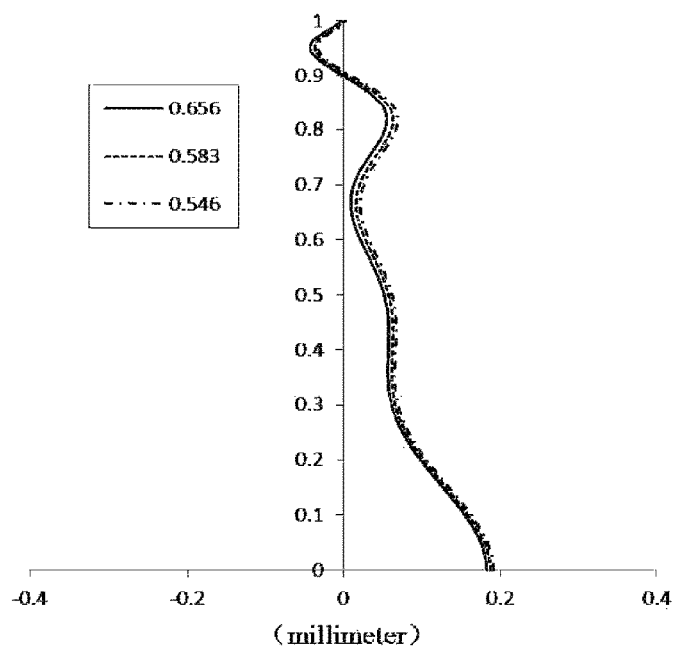
FIGS. 12-15 show a longitudinal aberration curve, an astigmatism curve, a distortion curve and a lateral color curve of an optical imaging lens assembly according to Embodiment 3 of the disclosure.
Figure 13:
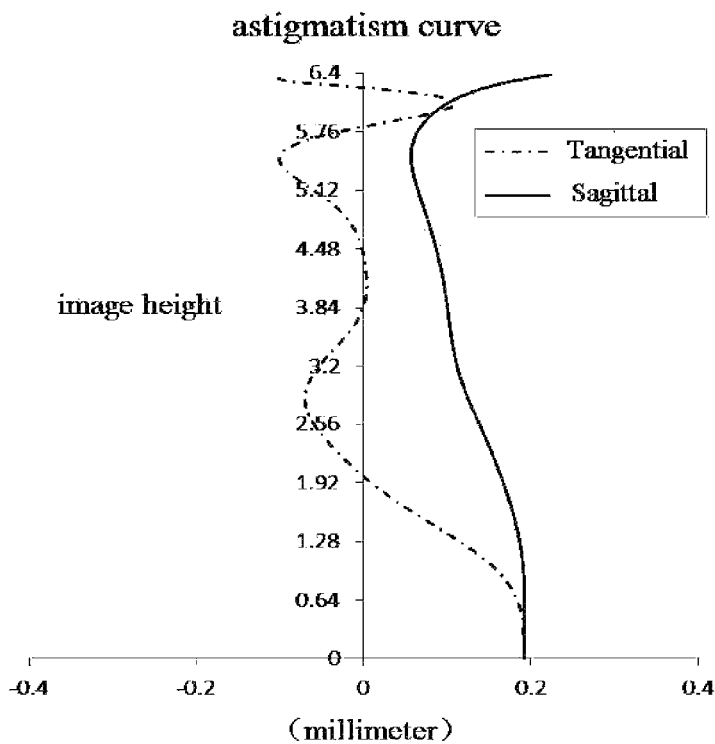
Figure 14:
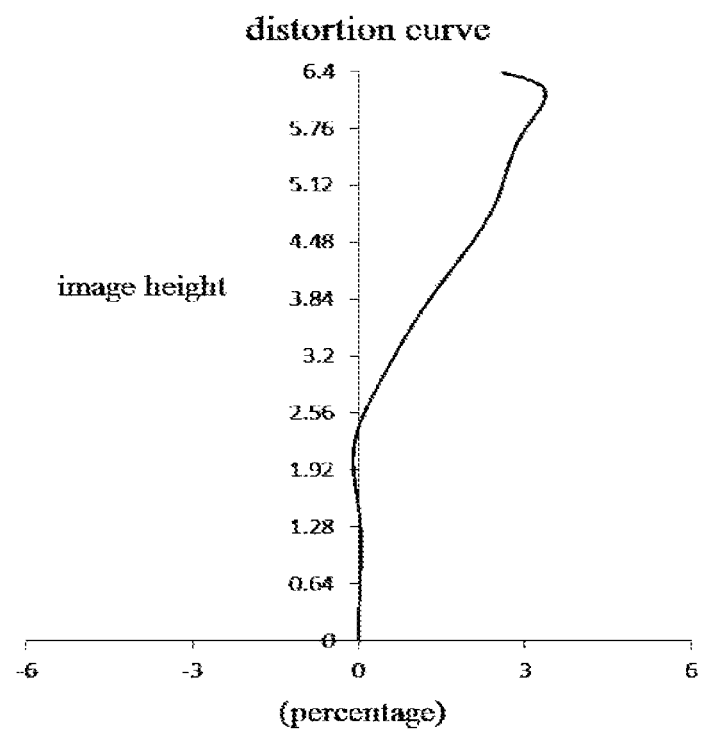
Figure 15:
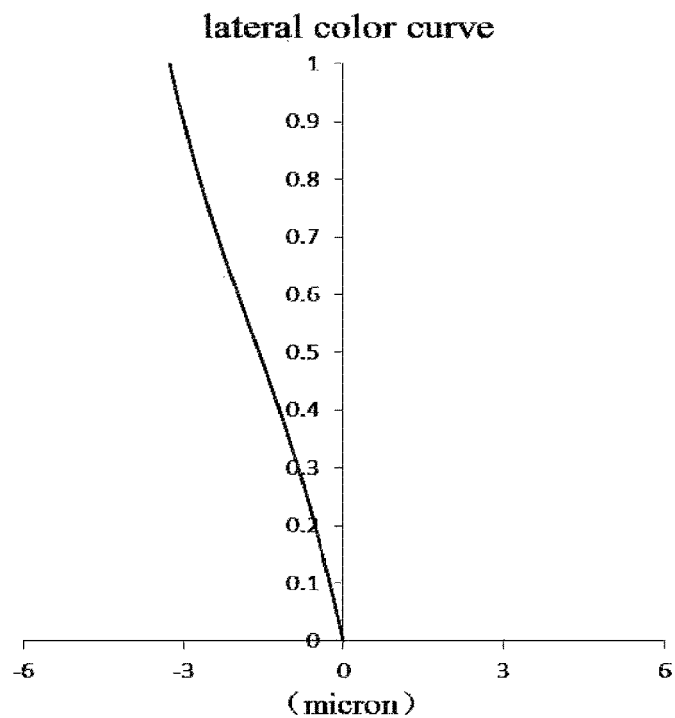

FIG. 12 shows a longitudinal aberration curve of the optical imaging lens assembly according to Embodiment 3 of the disclosure to represent deviation of a convergence focal point after light with different wavelengths passes through the lens. FIG. 13 shows an astigmatism curve of the optical imaging lens assembly according to Embodiment 3 of the disclosure to represent a curvature of tangential image surface and a curvature of sagittal image surface. FIG. 14 shows a distortion curve of the optical imaging lens assembly according to Embodiment 3 of the disclosure to represent distortion values corresponding to different image heights. FIG. 15 shows a lateral color curve of the optical imaging lens assembly according to Embodiment 3 of the disclosure to represent deviation of different image heights on the imaging surface after the light passes through the lens. According to FIGS. 12-15, it can be seen that the optical imaging lens assembly provided in Embodiment 3 of the disclosure may achieve high imaging quality.

Embodiment 4

Figure 16:
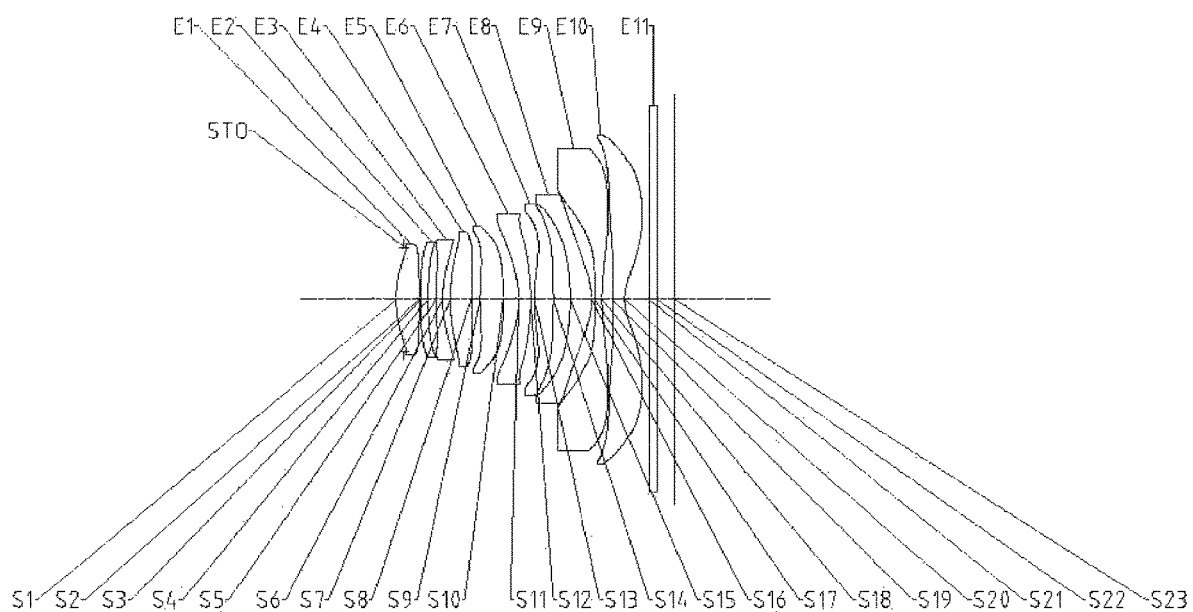
FIG. 16 shows a structural schematic diagram of an optical imaging lens assembly according to Embodiment 4 of the disclosure.

FIG. 16 shows a structural schematic diagram of an optical imaging lens assembly according to Embodiment 4 of the disclosure. As shown in FIG. 16, the optical imaging lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a concave surface, and an image-side surface S12 thereof is a convex surface. The seventh lens E7 has a positive refractive power, an object-side surface S13 thereof is a convex surface, and an image-side surface S14 thereof is a convex surface. The eighth lens E8 has a positive refractive power, an object-side surface S15 thereof is a concave surface, and an image-side surface S16 thereof is a convex surface. The ninth lens E9 has a negative refractive power, an object-side surface S17 thereof is a concave surface, and an image-side surface S18 thereof is a concave surface. The tenth lens E10 has a negative refractive power, an object-side surface S19 thereof is a convex surface, and an image-side surface S20 thereof is a concave surface. Light from an object sequentially penetrates through each of the surfaces S1 to S22, and is finally imaged on the imaging surface S23.

Table 7 shows basic parameters of the optical imaging lens assembly of Embodiment 4, wherein the units of the curvature radius, the thickness and the focal length are all millimeters.

TABLE 7

| Surface number | Surface type | Curvature radius | Thickness | Focal length | Refractive index | Abbe number | Conic coefficient |
| --- | --- | --- | --- | --- | --- | --- | --- |
| OBJ | Spherical | Infinite | Infinite | | | | |
| STO | Spherical | Infinite | −0.2400 | | | | |
| S1 | Aspheric | 3.7562 | 0.7303 | 6.58 | 1.55 | 56.1 | −5.5741 |
| S2 | Aspheric | −70.7990 | 0.0500 | | | | −93.8840 |
| S3 | Aspheric | 19.6815 | 0.2100 | −32.42 | 1.55 | 56.1 | 49.2952 |
| S4 | Aspheric | 9.2696 | 0.2665 | | | | 11.4864 |
| S5 | Aspheric | 9.1988 | 0.2100 | −9.53 | 1.64 | 23.3 | −16.2010 |
| S6 | Aspheric | 3.6333 | 0.2313 | | | | −5.7382 |
| S7 | Aspheric | 5.5211 | 0.6637 | 15.50 | 1.55 | 56.1 | −1.4658 |
| S8 | Aspheric | 15.2879 | 0.2765 | | | | −46.8925 |
| S9 | Aspheric | 8.2779 | 0.7311 | 11.30 | 1.55 | 56.1 | −33.3843 |
| S10 | Aspheric | −23.2160 | 0.4876 | | | | 77.7890 |
| S11 | Aspheric | −3.0116 | 0.3833 | −9.67 | 1.64 | 23.3 | −1.9150 |
| S12 | Aspheric | −6.1645 | 0.1166 | | | | −4.0816 |
| S13 | Aspheric | 5.7221 | 0.5946 | 8.48 | 1.55 | 56.1 | −4.0281 |
| S14 | Aspheric | −23.0625 | 0.5259 | | | | 44.4835 |
| S15 | Aspheric | −7.9561 | 0.6974 | 4.90 | 1.55 | 56.1 | 4.1223 |
| S16 | Aspheric | −2.0602 | 0.1043 | | | | −6.0367 |
| S17 | Aspheric | −75.6654 | 0.2238 | −11.74 | 1.55 | 56.1 | 52.4768 |
| S18 | Aspheric | 6.9906 | 0.3224 | | | | −5.0924 |
| S19 | Aspheric | 14.9350 | 0.3930 | −3.23 | 1.55 | 56.1 | 7.0691 |
| S20 | Aspheric | 1.5568 | 0.7677 | | | | −4.5651 |
| S21 | Spherical | Infinite | 0.2500 | | 1.52 | 64.2 | |
| S22 | Spherical | Infinite | 0.5558 | | | | |
| S23 | Spherical | Infinite | | | | | |

In Embodiment 4, a value of a total effective focal length f of the optical imaging lens assembly is 7.31 mm, a value of an on-axis distance TTL from the object-side surface S1 of the first lens E1 to the imaging surface S23 is 8.79 mm, and ImgH is a half of a diagonal length of an effective pixel region on the imaging surface S23, and a value of ImgH is 6.47 mm.

The following Table 8 shows higher-order coefficients A4, A6, A8, A10, A12, A14, A16 and A18 applied to each of the aspheric mirror surfaces S1-S20 of the aspheric lenses in Embodiment 4 of the disclosure.

TABLE 8

| Surface number | A4 | A6 | A8 | A10 | A12 | A14 | A16 | A18 |
|---|---|---|---|---|---|---|---|---|
| S1 | 1.8177E−02 | −2.0052E−02 | 1.9434E−02 | −9.9640E−03 | 1.7942E−03 | 1.3229E−04 | −6.1006E−05 | 0.0000E+00 |
| S2 | −5.8323E−03 | 1.1202E−02 | −6.6469E−03 | −2.2667E−04 | 6.7542E−04 | −8.6082E−05 | −1.0246E−05 | 0.0000E+00 |
| S3 | −7.3317E−03 | 1.0135E−02 | 2.7323E−03 | −7.6294E−03 | 4.3408E−03 | −1.0046E−03 | 8.0794E−05 | 0.0000E+00 |
| S4 | −1.5195E−02 | 1.5201E−02 | −1.4087E−02 | 8.6837E−03 | −2.0088E−03 | −2.1973E−05 | 4.4740E−05 | 0.0000E+00 |
| S5 | −3.1396E−02 | 2.1257E−02 | −2.3512E−02 | 1.6894E−02 | −5.8397E−03 | 7.9989E−04 | −1.8079E−05 | 0.0000E+00 |
| S6 | −1.8210E−02 | 1.6903E−02 | −1.5443E−02 | 1.0534E−02 | −4.0274E−03 | 7.6207E−04 | −5.5988E−05 | 0.0000E+00 |
| S7 | −4.1456E−03 | 5.7157E−03 | −5.3939E−03 | 2.6050E−03 | −7.0882E−04 | 9.4615E−05 | −4.7534E−06 | 0.0000E+00 |
| S8 | −1.7918E−02 | 7.6040E−03 | −2.0504E−03 | −2.5569E−04 | 2.7612E−04 | −6.5272E−05 | 5.2091E−06 | 0.0000E+00 |
| S9 | −1.6977E−02 | 4.7932E−03 | −5.8209E−03 | 3.2142E−03 | −9.8297E−04 | 1.6262E−04 | −1.3093E−05 | 3.5782E−07 |
| S10 | −1.4730E−02 | −1.9085E−03 | 1.6742E−03 | −1.2796E−03 | 4.9341E−04 | −1.0225E−04 | 1.0803E−05 | −4.4419E−07 |
| S11 | 2.3380E−02 | −6.3962E−03 | 1.6193E−03 | −1.1928E−03 | 5.5807E−04 | −1.3132E−04 | 1.5408E−05 | −7.1854E−07 |
| S12 | 1.1577E−02 | −5.4814E−03 | 2.2026E−03 | −9.0619E−04 | 2.5278E−04 | −4.1052E−05 | 3.6329E−06 | −1.3577E−07 |
| S13 | −1.3125E−02 | −1.7672E−03 | 2.0244E−03 | −1.0575E−03 | 2.8259E−04 | −4.0418E−05 | 2.9337E−06 | −8.4971E−08 |
| S14 | 3.1693E−03 | 1.1232E−03 | −2.6766E−03 | 1.0118E−03 | −1.9149E−04 | 2.0685E−05 | −1.2232E−06 | 3.0771E−08 |
| S15 | −1.1763E−02 | 1.5376E−02 | −8.8755E−03 | 2.5925E−03 | −4.2683E−04 | 4.0048E−05 | −1.9994E−06 | 4.1242E−08 |
| S16 | −3.4574E−03 | 4.1691E−03 | −2.0709E−03 | 5.3873E−04 | −7.5305E−05 | 5.7231E−06 | −2.2322E−07 | 3.5038E−09 |
| S17 | −8.5334E−03 | −6.4228E−03 | 2.7547E−03 | −6.1723E−04 | 8.3224E−05 | −6.5869E−06 | 2.8158E−07 | −5.0143E−09 |
| S18 | −1.0617E−02 | 1.4110E−03 | −1.2721E−04 | 6.5451E−06 | −1.4414E−07 | −1.7409E−09 | 1.3589E−10 | −1.7241E−12 |
| S19 | −2.2249E−02 | 4.1656E−03 | −4.0006E−04 | 2.0731E−05 | −5.0238E−07 | −9.4158E−10 | 3.0688E−10 | −4.5730E−12 |
| S20 | −2.4386E−02 | 4.2879E−03 | −5.1007E−04 | 3.8491E−05 | −1.7613E−06 | 4.4781E−08 | −5.2040E−10 | 1.3157E−12 |

Figure 17:
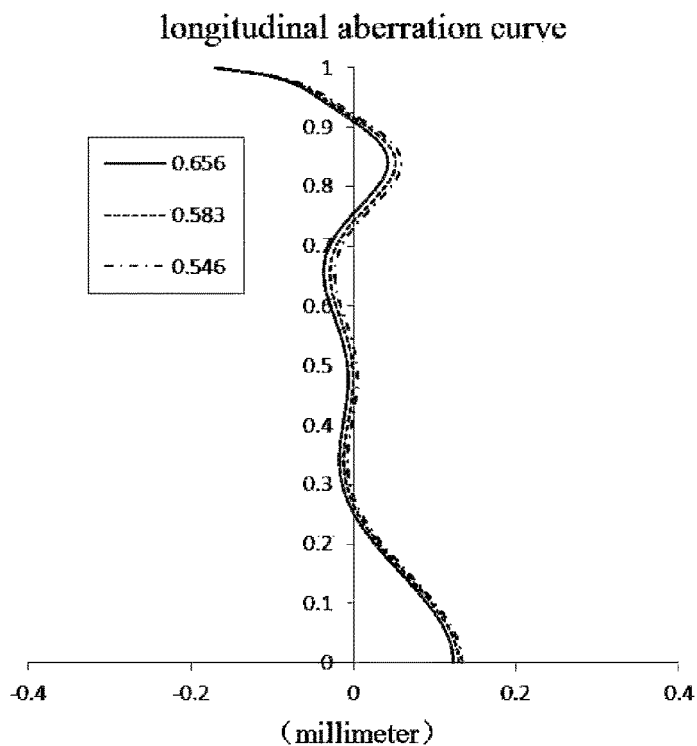
FIGS. 17-20 show a longitudinal aberration curve, an astigmatism curve, a distortion curve and a lateral color curve of an optical imaging lens assembly according to Embodiment 4 of the disclosure.
Figure 18:
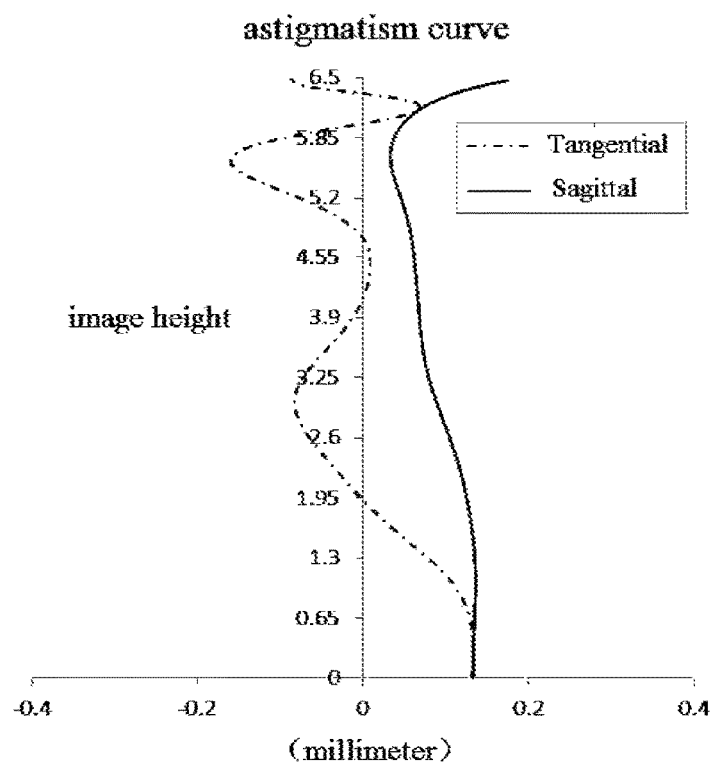
Figure 19:
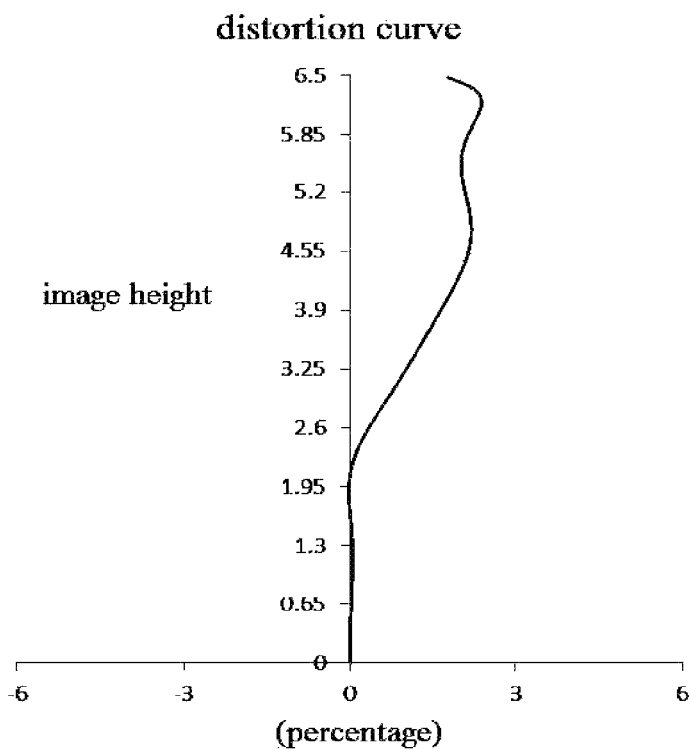
Figure 20:
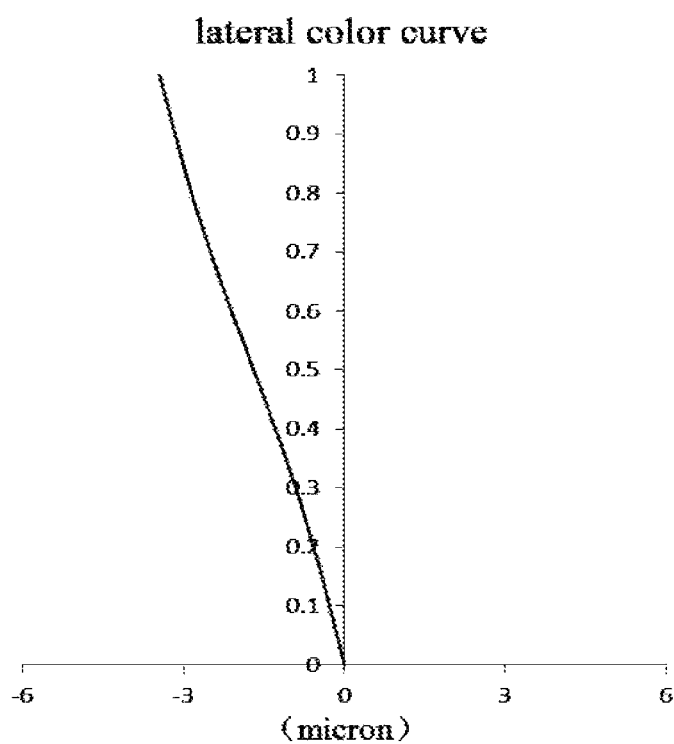

FIG. 17 shows a longitudinal aberration curve of the optical imaging lens assembly according to Embodiment 4 of the disclosure to represent deviation of a convergence focal point after light with different wavelengths passes through the lens. FIG. 18 shows an astigmatism curve of the optical imaging lens assembly according to Embodiment 4 of the disclosure to represent a curvature of tangential image surface and a curvature of sagittal image surface. FIG. 19 shows a distortion curve of the optical imaging lens assembly according to Embodiment 4 of the disclosure to represent distortion values corresponding to different image heights. FIG. 20 shows a lateral color curve of the optical imaging lens assembly according to Embodiment 4 of the disclosure to represent deviation of different image heights on the imaging surface after the light passes through the lens. According to FIGS. 17-20, it can be seen that the optical imaging lens assembly provided in Embodiment 4 of the disclosure may achieve high imaging quality.

Embodiment 5

Figure 21:
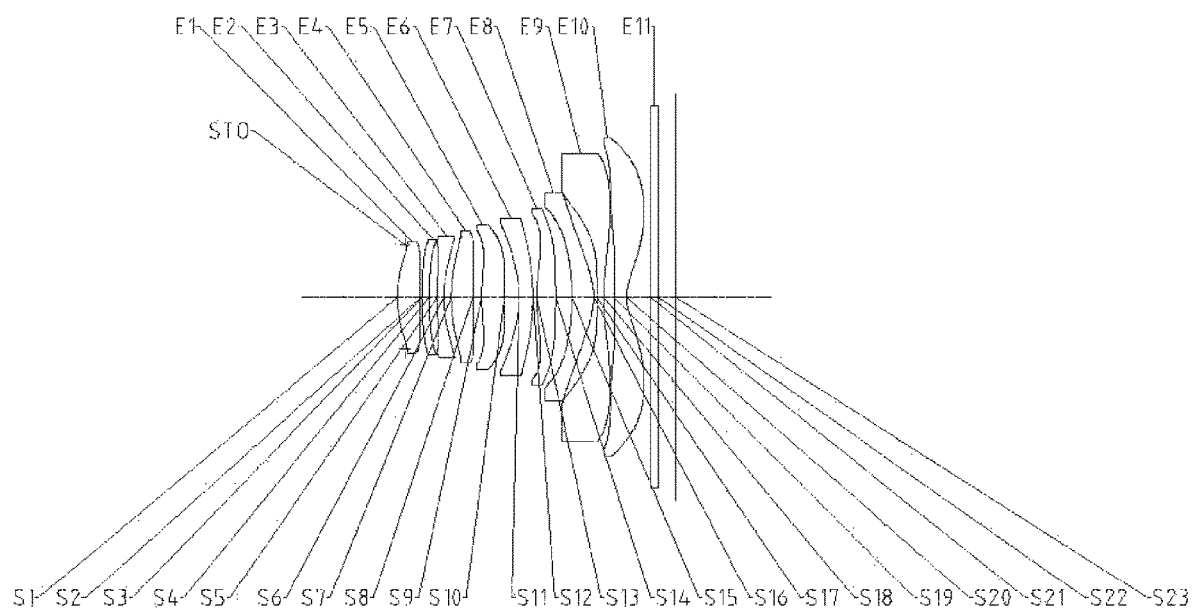
FIG. 21 shows a structural schematic diagram of an optical imaging lens assembly according to Embodiment 5 of the disclosure.

FIG. 21 shows a structural schematic diagram of an optical imaging lens assembly according to Embodiment 5 of the disclosure. As shown in FIG. 21, the optical imaging lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a concave surface. The sixth lens E6 has a negative refractive power, an object-side surface S11 thereof is a concave surface, and an image-side surface S12 thereof is a convex surface. The seventh lens E7 has a positive refractive power, an object-side surface S13 thereof is a convex surface, and an image-side surface S14 thereof is a convex surface. The eighth lens E8 has a positive refractive power, an object-side surface S15 thereof is a concave surface, and an image-side surface S16 thereof is a convex surface. The ninth lens E9 has a negative refractive power, an object-side surface S17 thereof is a concave surface, and an image-side surface S18 thereof is a concave surface. The tenth lens E10 has a negative refractive power, an object-side surface S19 thereof is a convex surface, and an image-side surface S20 thereof is a concave surface. Light from an object sequentially penetrates through each of the surfaces S1 to S22 and is finally imaged on the imaging surface S23.

Table 9 shows basic parameters of the optical imaging lens assembly of Embodiment 5, wherein the units of the curvature radius, the thickness and the focal length are all millimeters.

TABLE 9

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.2400 | | | | |
| S1 | Aspheric | 3.7222 | 0.7322 | 6.60 | 1.55 | 56.1 | −5.5336 |
| S2 | Aspheric | −96.4755 | 0.0500 | | | | 46.6058 |
| S3 | Aspheric | 19.6809 | 0.2100 | −33.52 | 1.55 | 56.1 | 52.5441 |
| S4 | Aspheric | 9.4333 | 0.2577 | | | | 11.2302 |
| S5 | Aspheric | 9.3710 | 0.2100 | −9.32 | 1.64 | 23.3 | −15.3339 |
| S6 | Aspheric | 3.6107 | 0.2339 | | | | −5.8050 |
| S7 | Aspheric | 5.0895 | 0.6815 | 15.40 | 1.55 | 56.1 | −1.4483 |
| S8 | Aspheric | 12.3465 | 0.2737 | | | | −48.1417 |
| S9 | Aspheric | 6.5648 | 0.7183 | 12.87 | 1.55 | 56.1 | −29.6585 |
| S10 | Aspheric | 99.7597 | 0.4665 | | | | −99.0000 |
| S11 | Aspheric | −3.2575 | 0.4362 | −11.54 | 1.64 | 23.3 | −1.9654 |
| S12 | Aspheric | −6.1389 | 0.1121 | | | | −3.7598 |
| S13 | Aspheric | 5.7594 | 0.5976 | 8.55 | 1.55 | 56.1 | −3.3551 |
| S14 | Aspheric | −23.3941 | 0.5153 | | | | 42.5429 |
| S15 | Aspheric | −7.9785 | 0.7063 | 4.89 | 1.55 | 56.1 | 4.2751 |
| S16 | Aspheric | −2.0573 | 0.1002 | | | | −6.0284 |
| S17 | Aspheric | −75.1095 | 0.2153 | −11.74 | 1.55 | 56.1 | 68.1268 |
| S18 | Aspheric | 6.9905 | 0.3212 | | | | −5.0924 |
| S19 | Aspheric | 14.9336 | 0.3922 | −3.23 | 1.55 | 56.1 | 7.0767 |
| S20 | Aspheric | 1.5575 | 0.7596 | | | | −4.5287 |
| S21 | Spherical | Infinite | 0.2500 | | 1.52 | 64.2 | |
| S22 | Spherical | Infinite | 0.5476 | | | | |
| S23 | Spherical | Infinite | | | | | |

In Embodiment 5, a value of a total effective focal length f of the optical imaging lens assembly is 7.27 mm, a value of an on-axis distance TTL from the object-side surface S1 of the first lens E1 to the imaging surface S23 is 8.79 mm, and ImgH is a half of a diagonal length of an effective pixel region on the imaging surface S23, and a value of ImgH is 6.44 mm.

The following Table 10 shows higher-order coefficients A4, A6, A8, A10, A12, A14, A16 and A18 applied to each of the aspheric mirror surfaces S1-S20 of the aspheric lenses in Embodiment 5 of the disclosure.

TABLE 10

| Surface number | A4 | A6 | A8 | A10 | A12 | A14 | A16 | A18 |
|---|---|---|---|---|---|---|---|---|
| S1 | 1.8098E−02 | −1.9723E−02 | 1.8826E−02 | −9.3917E−03 | 1.5137E−03 | 2.0583E−04 | −6.9218E−05 | 0.0000E+00 |
| S2 | −5.7077E−03 | 1.0881E−02 | −6.3086E−03 | −5.2129E−04 | 8.4242E−04 | −1.3720E−04 | −3.7260E−06 | 0.0000E+00 |
| S3 | −7.5404E−03 | 1.0570E−02 | 2.7267E−03 | −7.9864E−03 | 4.6207E−03 | −1.0925E−03 | 9.1137E−05 | 0.0000E+00 |
| S4 | −1.5165E−02 | 1.5003E−02 | −1.3818E−02 | 8.4432E−03 | −1.8931E−03 | −5.0823E−05 | 4.7653E−05 | 0.0000E+00 |
| S5 | −3.1358E−02 | 2.1338E−02 | −2.3647E−02 | 1.7080E−02 | −5.9739E−03 | 8.4657E−04 | −2.4171E−05 | 0.0000E+00 |
| S6 | −1.8554E−02 | 1.7703E−02 | −1.6518E−02 | 1.1282E−02 | −4.3072E−03 | 8.1484E−04 | −5.9906E−05 | 0.0000E+00 |
| S7 | −4.0588E−03 | 5.2323E−03 | −4.7446E−03 | 2.1599E−03 | −5.3923E−04 | 6.1576E−05 | −2.1995E−06 | 0.0000E+00 |
| S8 | −1.8191E−02 | 8.1917E−03 | −2.6742E−03 | 1.0043E−04 | 1.6472E−04 | −4.7636E−05 | 4.1060E−06 | 0.0000E+00 |
| S9 | −1.6457E−02 | 4.1161E−03 | −5.1108E−03 | 2.8741E−03 | −9.1996E−04 | 1.6551E−04 | −1.5516E−05 | 5.8112E−07 |
| S10 | −1.5322E−02 | −1.4710E−03 | 1.3809E−03 | −1.2679E−03 | 5.4951E−04 | −1.2473E−04 | 1.4299E−05 | −6.4269E−07 |
| S11 | 2.3671E−02 | −6.6533E−03 | 1.7968E−03 | −1.2400E−03 | 5.5674E−04 | −1.2841E−04 | 1.4895E−05 | −6.8933E−07 |
| S12 | 1.1260E−02 | −5.0082E−03 | 1.7762E−03 | −6.9924E−04 | 1.9418E−04 | −3.1338E−05 | 2.7680E−06 | −1.0399E−07 |
| S13 | −1.2171E−02 | −1.4880E−03 | 1.6611E−03 | −9.0950E−04 | 2.4988E−04 | −3.6327E−05 | 2.6625E−06 | −7.7568E−08 |
| S14 | 2.7034E−03 | 1.1116E−03 | −2.6748E−03 | 1.0205E−03 | −1.9466E−04 | 2.1182E−05 | −1.2610E−06 | 3.1917E−08 |
| S15 | −1.1102E−02 | 1.4866E−02 | −8.5358E−03 | 2.4736E−03 | −4.0377E−04 | 3.7550E−05 | −1.8581E−06 | 3.7997E−08 |
| S16 | −3.6555E−03 | 4.3969E−03 | −2.1781E−03 | 5.6488E−04 | −7.8964E−05 | 6.0179E−06 | −2.3586E−07 | 3.7262E−09 |
| S17 | −8.0513E−03 | −6.8784E−03 | 2.9680E−03 | −6.6717E−04 | 8.9633E−05 | −7.0425E−06 | 2.9812E−07 | −5.2472E−09 |
| S18 | −1.0617E−02 | 1.4110E−03 | −1.2721E−04 | 6.5451E−06 | −1.4414E−07 | −1.7409E−09 | 1.3589E−10 | −1.7241E−12 |
| S19 | −2.2294E−02 | 4.1760E−03 | −4.0065E−04 | 2.0717E−05 | −4.9697E−07 | −1.3573E−09 | 3.2060E−10 | −4.7446E−12 |
| S20 | −2.4517E−02 | 4.3472E−03 | −5.2137E−04 | 3.9671E−05 | −1.8285E−06 | 4.6644E−08 | −5.3633E−10 | 1.1782E−12 |

Figure 22:
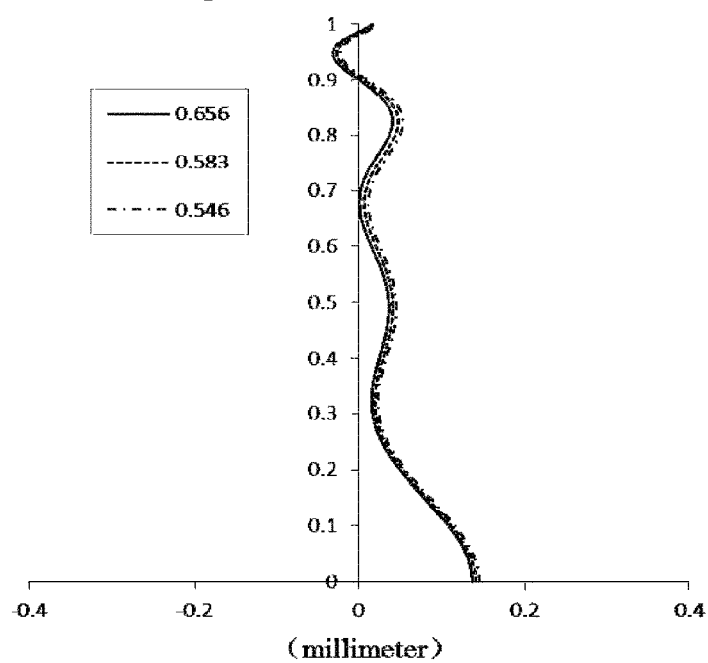
FIGS. 22-25 show a longitudinal aberration curve, an astigmatism curve, a distortion curve and a lateral color curve of an optical imaging lens assembly according to Embodiment 5 of the disclosure.
Figure 23:
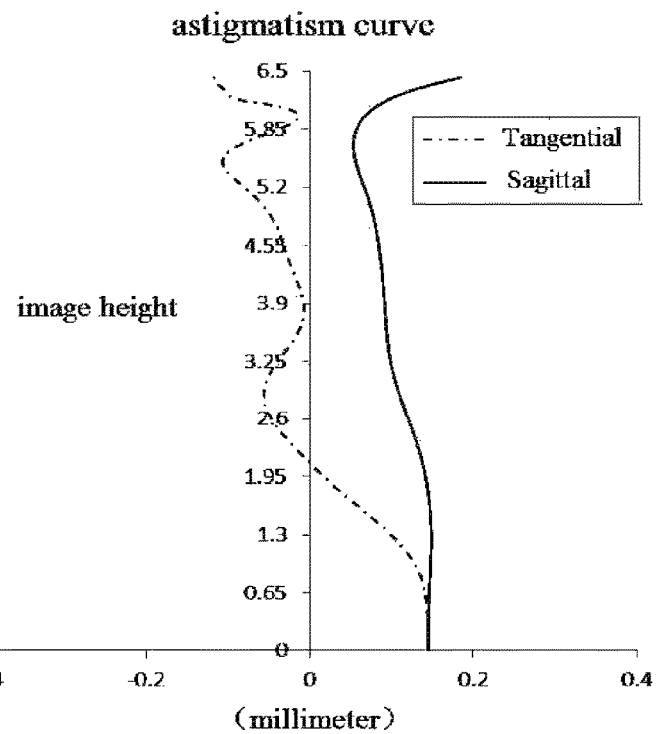
Figure 24:
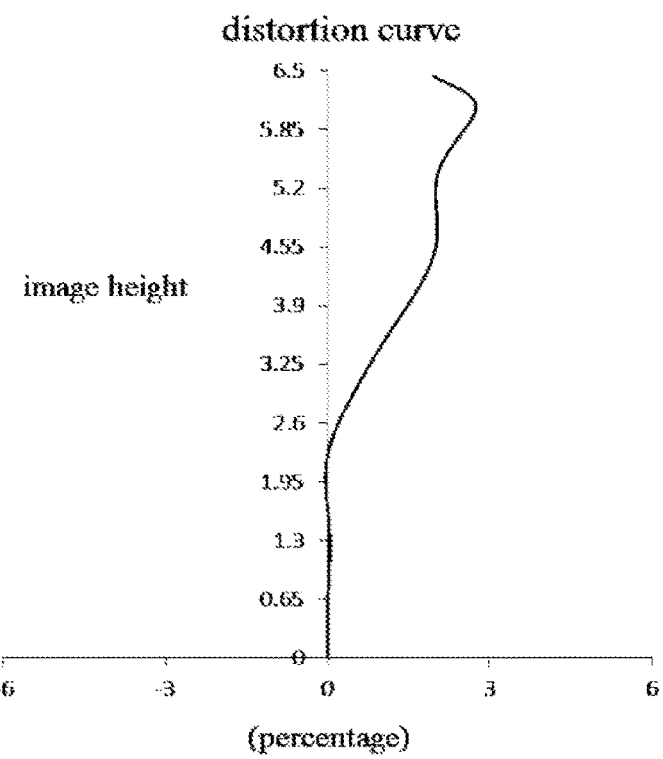
Figure 25:
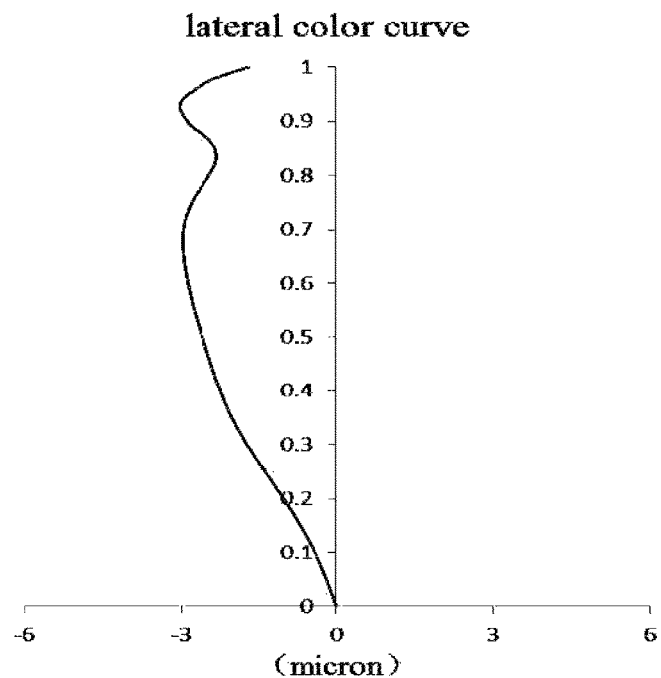

FIG. 22 shows a longitudinal aberration curve of the optical imaging lens assembly according to Embodiment 5 of the disclosure to represent deviation of a convergence focal point after light with different wavelengths passes through the lens. FIG. 23 shows an astigmatism curve of the optical imaging lens assembly according to Embodiment 5 of the disclosure to represent a curvature of tangential image surface and a curvature of sagittal image surface. FIG. 24 shows a distortion curve of the optical imaging lens assembly according to Embodiment 5 of the disclosure to represent distortion values corresponding to different image heights. FIG. 25 shows a lateral color curve of the optical imaging lens assembly according to Embodiment 5 of the disclosure to represent deviation of different image heights on the imaging surface after the light passes through the lens. According to FIGS. 22-25, it can be seen that the optical imaging lens assembly provided in Embodiment 5 of the disclosure may achieve high imaging quality.

Embodiment 6

Figure 26:
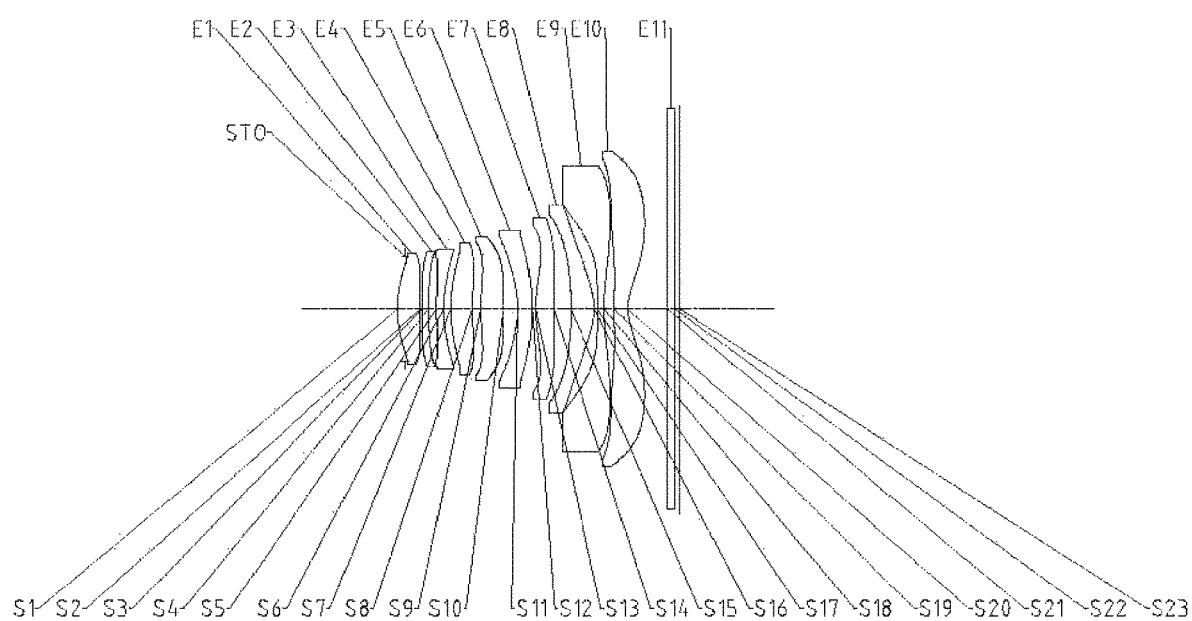
FIG. 26 shows a structural schematic diagram of an optical imaging lens assembly according to Embodiment 6 of the disclosure.

FIG. 26 shows a structural schematic diagram of an optical imaging lens assembly according to Embodiment 6 of the disclosure. As shown in FIG. 26, the optical imaging lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a concave surface. The sixth lens E6 has a negative refractive power, an object-side surface S11 thereof is a concave surface, and an image-side surface S12 thereof is a convex surface. The seventh lens E7 has a positive refractive power, an object-side surface S13 thereof is a convex surface, and an image-side surface S14 thereof is a concave surface. The eighth lens E8 has a positive refractive power, an object-side surface S15 thereof is a concave surface, and an image-side surface S16 thereof is a convex surface. The ninth lens E9 has a negative refractive power, an object-side surface S17 thereof is a concave surface, and an image-side surface S18 thereof is a concave surface. The tenth lens E10 has a negative refractive power, an object-side surface S19 thereof is a convex surface, and an image-side surface S20 thereof is a concave surface. Light from an object sequentially penetrates through each of the surfaces S1 to S22, and is finally imaged on the imaging surface S23.

Table 11 shows basic parameters of the optical imaging lens assembly of Embodiment 6, wherein the units of the curvature radius, the thickness and the focal length are all millimeters.

TABLE 11

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.2400 | | | | |
| S1 | Aspheric | 3.7529 | 0.7265 | 6.61 | 1.55 | 56.1 | −5.5465 |
| S2 | Aspheric | −80.9978 | 0.0500 | | | | 55.1629 |
| S3 | Aspheric | 27.8397 | 0.2100 | −33.81 | 1.55 | 56.1 | 52.7265 |
| S4 | Aspheric | 11.0498 | 0.2491 | | | | 11.1893 |
| S5 | Aspheric | 11.0797 | 0.2100 | −9.17 | 1.64 | 23.3 | −15.1533 |
| S6 | Aspheric | 3.8068 | 0.2344 | | | | −5.8212 |
| S7 | Aspheric | 5.2138 | 0.6798 | 15.74 | 1.55 | 56.1 | −1.4419 |
| S8 | Aspheric | 12.7068 | 0.2696 | | | | −47.6584 |
| S9 | Aspheric | 6.7216 | 0.7123 | 12.59 | 1.55 | 56.1 | −29.4936 |
| S10 | Aspheric | 330.9157 | 0.4528 | | | | −99.0000 |
| S11 | Aspheric | −3.2493 | 0.4471 | −11.60 | 1.64 | 23.3 | −1.9774 |
| S12 | Aspheric | −6.0922 | 0.1056 | | | | −3.6283 |
| S13 | Aspheric | 5.0405 | 0.5847 | 9.73 | 1.55 | 56.1 | −3.1625 |
| S14 | Aspheric | 100.3124 | 0.5438 | | | | −99.0000 |
| S15 | Aspheric | −9.9879 | 0.7445 | 4.56 | 1.55 | 56.1 | 3.7793 |
| S16 | Aspheric | −2.0421 | 0.1033 | | | | −6.0982 |
| S17 | Aspheric | −71.2551 | 0.2111 | −11.69 | 1.55 | 56.1 | 19.6420 |
| S18 | Aspheric | 6.9956 | 0.3180 | | | | −5.0924 |
| S19 | Aspheric | 14.9697 | 0.4151 | −3.32 | 1.55 | 56.1 | 7.0723 |
| S20 | Aspheric | 1.5968 | 1.2494 | | | | −4.6069 |
| S21 | Spherical | Infinite | 0.2500 | | 1.52 | 64.2 | |
| S22 | Spherical | Infinite | 0.1295 | | | | |
| S23 | Spherical | Infinite | | | | | |

In Embodiment 6, a value of a total effective focal length f of the optical imaging lens assembly is 7.29 mm, a value of an on-axis distance TTL from the object-side surface S1 of the first lens E1 to the imaging surface S23 is 8.90 mm, and ImgH is a half of a diagonal length of an effective pixel region on the imaging surface S23, and a value of ImgH is 6.46 mm.

The following Table 12 shows higher-order coefficients A4, A6, A8, A10, A12, A14, A16 and A18 applied to each of the aspheric mirror surfaces S1-S20 of the aspheric lenses in Embodiment 6 of the disclosure.

TABLE 12

| Surface number | A4 | A6 | A8 | A10 | A12 | A14 | A16 | A18 |
|---|---|---|---|---|---|---|---|---|
| S1  | 1.8015E−02  | −1.9459E−02 | 1.8379E−02  | −9.0377E−03 | 1.3807E−03  | 2.2757E−04  | −7.0198E−05 | 0.0000E+00 |
| S2  | −5.7005E−03 | 1.0870E−02  | −6.2938E−03 | −5.6183E−04 | 8.8409E−04  | −1.5335E−04 | −1.4671E−06 | 0.0000E+00 |
| S3  | −7.4463E−03 | 1.0071E−02  | 3.7045E−03  | −8.9280E−03 | 5.0999E−03  | −1.2176E−03 | 1.0441E−04  | 0.0000E+00 |
| S4  | −1.5180E−02 | 1.5091E−02  | −1.3991E−02 | 8.5953E−03  | −1.9646E−03 | −3.3584E−05 | 4.5972E−05  | 0.0000E+00 |
| S5  | −3.1286E−02 | 2.1081E−02  | −2.3368E−02 | 1.7014E−02  | −6.0322E−03 | 8.8258E−04  | −2.9771E−05 | 0.0000E+00 |
| S6  | −1.8677E−02 | 1.7936E−02  | −1.6872E−02 | 1.1576E−02  | −4.4330E−03 | 8.4079E−04  | −6.1933E−05 | 0.0000E+00 |
| S7  | −4.0931E−03 | 5.3007E−03  | −4.8405E−03 | 2.2194E−03  | −5.5668E−04 | 6.4005E−05  | −2.3299E−06 | 0.0000E+00 |
| S8  | −1.8131E−02 | 8.1663E−03  | −2.7316E−03 | 1.5871E−04  | 1.4288E−04  | −4.3927E−05 | 3.8672E−06  | 0.0000E+00 |
| S9  | −1.6448E−02 | 4.0141E−03  | −5.0222E−03 | 2.8814E−03  | −9.4849E−04 | 1.7657E−04  | −1.7278E−05 | 6.8577E−07 |
| S10 | −1.5465E−02 | −1.6869E−03 | 1.8549E−03  | −1.6558E−03 | 7.1009E−04  | −1.6089E−04 | 1.8540E−05  | −8.4596E−07 |
| S11 | 2.3319E−02  | −5.5275E−03 | 5.3220E−04  | −5.1558E−04 | 3.2230E−04  | −8.4926E−05 | 1.0570E−05  | −5.1030E−07 |
| S12 | 1.1522E−02  | −5.7817E−03 | 2.5319E−03  | −1.0818E−03 | 3.0468E−04  | −4.9723E−05 | 4.4104E−06  | −1.6506E−07 |
| S13 | −1.1611E−02 | −3.4217E−04 | 1.9718E−04  | −2.2538E−04 | 8.4552E−05  | −1.4492E−05 | 1.1695E−06  | −3.6234E−08 |
| S14 | 1.9509E−03  | 1.5918E−03  | −3.0127E−03 | 1.1416E−03  | −2.1770E−04 | 2.3559E−05  | −1.3868E−06 | 3.4593E−08 |
| S15 | −9.5726E−03 | 1.3364E−02  | −7.5902E−03 | 2.1767E−03  | −3.5288E−04 | 3.2718E−05  | −1.6204E−06 | 3.3283E−08 |
| S16 | −3.2301E−03 | 3.8822E−03  | −1.9878E−03 | 5.3651E−04  | −7.7554E−05 | 6.0785E−06  | −2.4415E−07 | 3.9438E−09 |
| S17 | −3.9218E−03 | −1.1536E−02 | 4.9802E−03  | −1.1205E−03 | 1.4812E−04  | −1.1399E−05 | 4.7241E−07  | −8.1480E−09 |
| S18 | −1.0617E−02 | 1.4110E−03  | −1.2721E−04 | 6.5451E−06  | −1.4414E−07 | −1.7409E−09 | 1.3589E−10  | −1.7241E−12 |
| S19 | −2.2308E−02 | 4.2087E−03  | −4.0809E−04 | 2.1771E−05  | −5.9276E−07 | 3.5635E−09  | 1.8760E−10  | −3.2548E−12 |
| S20 | −2.5575E−02 | 4.5004E−03  | −5.2789E−04 | 4.0410E−05  | −1.9350E−06 | 5.3494E−08  | −7.4122E−10 | 3.5480E−12 |

Figure 27:
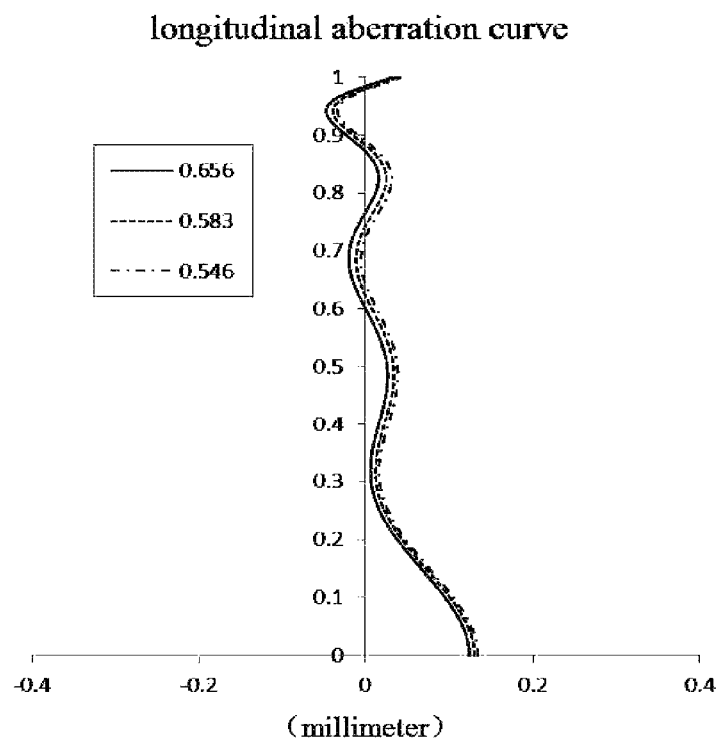
FIGS. 27-30 show a longitudinal aberration curve, an astigmatism curve, a distortion curve and a lateral color curve of an optical imaging lens assembly according to Embodiment 6 of the disclosure.
Figure 28:
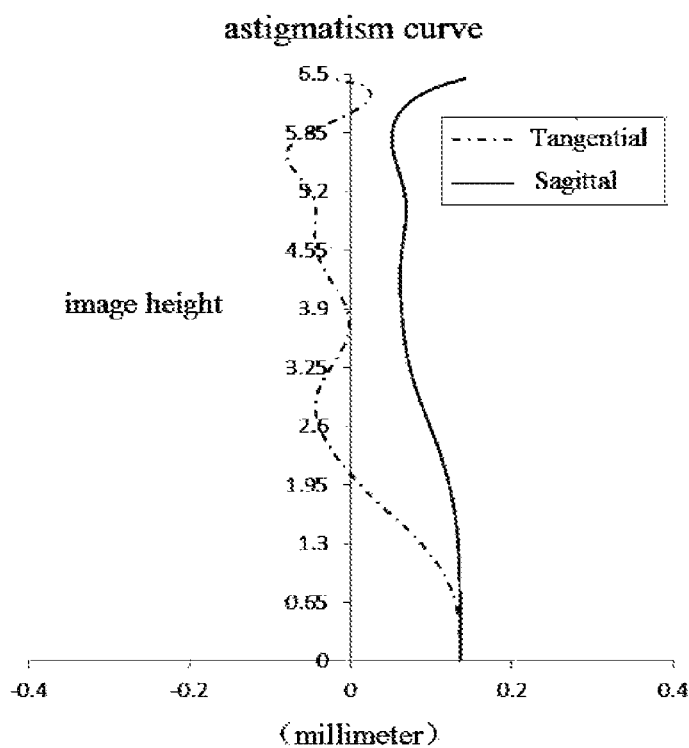
Figure 29:
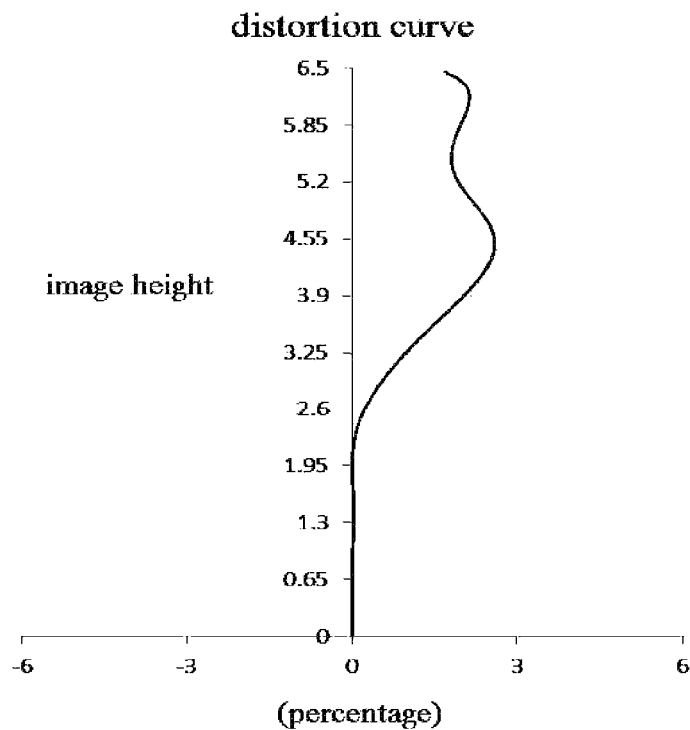
Figure 30:
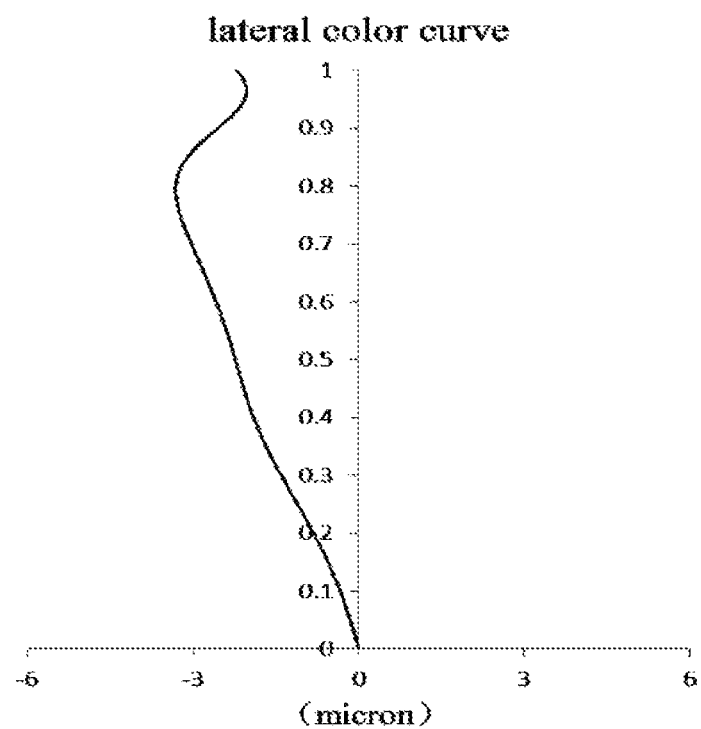

FIG. 27 shows a longitudinal aberration curve of the optical imaging lens assembly according to Embodiment 6 of the disclosure to represent deviation of a convergence focal point after light with different wavelengths passes through the lens. FIG. 28 shows an astigmatism curve of the optical imaging lens assembly according to Embodiment 6 of the disclosure to represent a curvature of tangential image surface and a curvature of sagittal image surface. FIG. 29 shows a distortion curve of the optical imaging lens assembly according to Embodiment 6 of the disclosure to represent distortion values corresponding to different image heights. FIG. 30 shows a lateral color curve of the optical imaging lens assembly according to Embodiment 6 of the disclosure to represent deviation of different image heights on the imaging surface after the light passes through the lens. According to FIGS. 27-30, it can be seen that the optical imaging lens assembly provided in Embodiment 6 of the disclosure may achieve high imaging quality.

To sum up, the optical parameters in Embodiment 1 to Embodiment 6 of the disclosure are shown in the following Table 13.

TABLE 13

| Parameters in the embodiments | 1 | 2 | 3 | 4 | 5 | 6 |
|---|---|---|---|---|---|---|
| f1 (mm) | 7.00 | 6.99 | 6.56 | 6.58 | 6.60 | 6.61 |
| f2 (mm) | −31.63 | −30.98 | −32.14 | −32.42 | −33.52 | −33.81 |
| f3 (mm) | −10.28 | −10.76 | −9.57 | −9.53 | −9.32 | −9.17 |
| f4 (mm) | 16.79 | 16.64 | 15.48 | 15.50 | 15.40 | 15.74 |
| f5 (mm) | 11.31 | 11.82 | 11.34 | 11.30 | 12.87 | 12.59 |
| f6 (mm) | −10.69 | −10.07 | −9.73 | −9.67 | −11.54 | −11.60 |

TABLE 13-continued

| Parameters in the embodiments | 1 | 2 | 3 | 4 | 5 | 6 |
|---|---|---|---|---|---|---|
| f7 (mm) | 8.77 | 8.55 | 8.55 | 8.48 | 8.55 | 9.73 |
| f8 (mm) | 5.12 | 5.08 | 4.92 | 4.90 | 4.89 | 4.56 |
| f9 (mm) | −13.16 | −11.88 | −11.80 | −11.74 | −11.74 | −11.69 |
| f10 (mm) | −3.62 | −3.35 | −3.23 | −3.23 | −3.23 | −3.32 |
| f (mm) | 7.13 | 7.20 | 7.26 | 7.31 | 7.27 | 7.29 |
| TTL (mm) | 8.52 | 8.65 | 8.65 | 8.79 | 8.79 | 8.90 |
| ImgH (mm) | 6.19 | 6.35 | 6.38 | 6.47 | 6.44 | 6.46 |

In Embodiments 1 to Embodiments 6 of the disclosure, each conditional expression satisfies the conditions in the following Table 14.

TABLE 14

| Conditional expression/ Embodiment | 1 | 2 | 3 | 4 | 5 | 6 |
|---|---|---|---|---|---|---|
| f * tan(1/2FOV) (mm) | 6.40 | 6.46 | 6.52 | 6.56 | 6.53 | 6.54 |
| f1/(f3 + f4) | 1.08 | 1.19 | 1.11 | 1.10 | 1.09 | 1.01 |
| (f6 + f10)/f9 | 1.09 | 1.13 | 1.10 | 1.10 | 1.26 | 1.28 |
| (R16 − R15)/f8 | 1.04 | 1.09 | 1.21 | 1.20 | 1.21 | 1.74 |
| TTL/ImgH | 1.38 | 1.36 | 1.35 | 1.36 | 1.36 | 1.38 |
| f (mm) | 7.13 | 7.20 | 7.26 | 7.31 | 7.27 | 7.29 |
| (R5 + R6)/(R5 − R6) | 2.77 | 2.81 | 2.39 | 2.31 | 2.25 | 2.05 |
| R12/R11 | 1.83 | 2.00 | 2.01 | 2.05 | 1.88 | 1.87 |
| (R19 + R20)/(R19 − R20) | 1.26 | 1.24 | 1.23 | 1.23 | 1.23 | 1.24 |
| (CT6 + CT7)/CT8 | 1.37 | 1.49 | 1.37 | 1.40 | 1.46 | 1.39 |
| f67/(f12 + f89) | 2.27 | 2.42 | 2.83 | 2.71 | 1.61 | 2.84 |
| CT5/ET5 | 2.83 | 2.62 | 2.89 | 2.92 | 1.96 | 2.06 |
| SAG82/SAG81 | 1.03 | 1.19 | 1.00 | 0.94 | 1.18 | 1.46 |

The disclosure also provides an imaging device, which is provided with an electronic photosensitive element for imaging. The electronic photosensitive element may be a Charge Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the abovementioned optical imaging lens assembly.

The above description is only description about the preferred embodiments of the disclosure and adopted technical principles. It is understood by those skilled in the art that the scope of disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens assembly, sequentially comprising from an object side to an image side along an optical axis:
    a first lens with a positive refractive power;
    a second lens with a refractive power;
    a third lens with a refractive power;
    a fourth lens with a refractive power;
    a fifth lens with a positive refractive power;
    a sixth lens with a negative refractive power;
    a seventh lens with a refractive power;
    an eighth lens with a positive refractive power;
    a ninth lens with a refractive power; and
    a tenth lens with a negative refractive power;
    wherein an effective focal length f of the optical imaging lens assembly and a maximum field of view FOV of the optical imaging lens assembly satisfy $f \times \tan(\frac{1}{2}FOV) > 6.0$ mm.

2. The optical imaging lens assembly according to claim 1, wherein an effective focal length f1 of the first lens, an effective focal length f3 of the third lens, and an effective focal length f4 of the fourth lens satisfy $0.8 < f1/(f3+f4) < 1.3$.

3. The optical imaging lens assembly according to claim 1, wherein an effective focal length f6 of the sixth lens, an effective focal length f10 of the tenth lens, and an effective focal length f9 of the ninth lens satisfy $1.0 < (f6+f10)/f9 < 1.5$.

4. The optical imaging lens assembly according to claim 1, wherein a curvature radius R16 of an image-side surface of the eighth lens, a curvature radius R15 of an object-side surface of the eighth lens, and an effective focal length f8 of the eighth lens satisfy $1.0 < (R16-R15)/f8 < 2.0$.

5. The optical imaging lens assembly according to claim 1, wherein ImgH is a half of a diagonal length of an effective pixel region on the imaging surface of the optical imaging lens assembly, and an on-axis distance TTL from an object-side surface of the first lens to an imaging surface and ImgH satisfy $TTL/ImgH < 1.4$.

6. The optical imaging lens assembly according to claim 1, wherein the effective focal length f of the optical imaging lens assembly satisfies $7.0$ mm $< f < 10.0$ mm.

7. The optical imaging lens assembly according to claim 1, wherein a curvature radius R5 of an object-side surface of the third lens and a curvature radius R6 of an image-side surface of the third lens satisfy $2.0 < (R5+R6)/(R5-R6) < 3.0$.

8. The optical imaging lens assembly according to claim 1, wherein a curvature radius R12 of an image-side surface of the sixth lens and a curvature radius R11 of an object-side surface of the sixth lens satisfy $1.5 < R12/R11 < 2.5$.

9. The optical imaging lens assembly according to claim 1, wherein a curvature radius R19 of an object-side surface of the tenth lens and a curvature radius R20 of an image-side surface of the tenth lens satisfy $1.0 < (R19+R20)/(R19-R20) < 1.5$.

10. The optical imaging lens assembly according to claim 1, wherein a center thickness CT6 of the sixth lens on the optical axis, a center thickness CT7 of the seventh lens on the optical axis, and a center thickness CT8 of the eighth lens on the optical axis satisfy $1.2 < (CT6+CT7)/CT8 < 1.6$.

11. The optical imaging lens assembly according to claim 1, wherein a combined focal length f67 of the sixth lens and the seventh lens, a combined focal length f12 of the first lens and the second lens, and a combined focal length f89 of the eighth lens and the ninth lens satisfy $1.5 < f67/(f12+f89) < 3.0$.

12. The optical imaging lens assembly according to claim 1, wherein an edge thickness ET5 of the fifth lens and a center thickness CT5 of the fifth lens on the optical axis satisfy $1.9 < CT5/ET5 < 3.0$.

13. The optical imaging lens assembly according to claim 1, wherein an on-axis distance SAG82 from an intersection point of an image-side surface of the eighth lens and the optical axis to an effective radius vertex of the image-side surface of the eighth lens and an on-axis distance SAG81 from an intersection point of an object-side surface of the eighth lens and the optical axis to an effective radius vertex of the object-side surface of the eighth lens satisfy $0.9 < SAG82/SAG81 < 1.5$.

14. The optical imaging lens assembly according to claim 1, wherein the lenses are independent of one another, and form air spaces on the optical axis; and at least four lenses in the first lens to the tenth lens are made of a plastic material.

15. The optical imaging lens assembly according to claim 1, wherein an object-side surface of the sixth lens is a concave surface, and an image-side surface is a convex surface; and an object-side surface of the eighth lens is a concave surface, and an image-side surface is a convex surface.

16. An optical imaging lens assembly, sequentially comprising, from an object side to an image side along an optical axis:
    a first lens with a positive refractive power;
    a second lens with a refractive power;
    a third lens with a refractive power;
    a fourth lens with a refractive power;
    a fifth lens with a positive refractive power;
    a sixth lens with a negative refractive power;
    a seventh lens with a refractive power;
    an eighth lens with a positive refractive power;
    a ninth lens with a refractive power; and
    a tenth lens with a negative refractive power;
    wherein the lenses are independent of one another, and form air spaces on the optical axis; and
    ImgH is a half of a diagonal length of an effective pixel region on the imaging surface of the optical imaging lens assembly, and an on-axis distance TTL from an object-side surface of the first lens to an imaging surface and ImgH satisfy $TTL/ImgH < 1.4$.

17. The optical imaging lens assembly according to claim 16, an effective focal length f of the optical imaging lens assembly and a maximum field of view FOV of the optical imaging lens assembly satisfy $f \times \tan(\frac{1}{2}FOV) > 6.0$ mm.

18. The optical imaging lens assembly according to claim 16, an effective focal length f1 of the first lens, an effective focal length f3 of the third lens, and an effective focal length f4 of the fourth lens satisfy $0.8<f1/(f3+f4)<1.3$; and an effective focal length f6 of the sixth lens, an effective focal length f10 of the tenth lens, and an effective focal length f9 of the ninth lens satisfy $1.0<(f6+f10)/f9<1.5$.

19. The optical imaging lens assembly according to claim 16, a curvature radius R16 of an image-side surface of the eighth lens, a curvature radius R15 of an object-side surface of the eighth lens, and an effective focal length f8 of the eighth lens satisfy $1.0<(R16-R15)/f8<2.0$.

20. The optical imaging lens assembly according to claim 16, a curvature radius R5 of an object-side surface of the third lens and a curvature radius R6 of an image-side surface of the third lens satisfy $2.0<(R5+R6)/(R5-R6)<3.0$.

\* \* \* \* \*